(12) United States Patent
Takenaka et al.

(10) Patent No.: US 6,429,541 B2
(45) Date of Patent: Aug. 6, 2002

(54) HYBRID DRIVE APPARATUS

(75) Inventors: Masayuki Takenaka; Naruhiko Kutsuna, both of Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 29 days.

(21) Appl. No.: 09/740,062

(22) Filed: Dec. 20, 2000

(30) Foreign Application Priority Data

Dec. 27, 1999 (JP) .......................................... 11-371845
Dec. 27, 1999 (JP) .......................................... 11-371846
Sep. 28, 2000 (JP) ........................................ 2000-295672

(51) Int. Cl.$^7$ ............................................. F02N 11/06
(52) U.S. Cl. ...................... 290/40 C; 290/45; 180/65.6; 74/661
(58) Field of Search ............................... 290/40 C, 45; 180/65.2, 65.6, 65.3; 74/661

(56) References Cited

U.S. PATENT DOCUMENTS

| | | | |
|---|---|---|---|
| 5,558,595 A | | 9/1996 | Schmidt et al. ................. 477/3 |
| 5,643,119 A | * | 7/1997 | Yamaguchi et al. ........ 180/65.2 |
| 5,788,006 A | * | 8/1998 | Yamaguchi ................. 180/65.2 |
| 5,856,709 A | * | 1/1999 | Ibaraki et al. ............... 180/165 |
| 5,875,691 A | * | 3/1999 | Hata et al. ....................... 475/5 |
| 5,943,918 A | * | 8/1999 | Reed et al. ............... 192/219.5 |
| 6,142,907 A | * | 11/2000 | Minowa et al. ............ 180/65.2 |
| 6,155,364 A | * | 12/2000 | Nagano et al. ............. 180/65.2 |
| 6,332,257 B1 | * | 12/2001 | Reed et al. ................. 29/401.1 |

FOREIGN PATENT DOCUMENTS

| | | | | |
|---|---|---|---|---|
| EP | 0751025 A1 | * | 2/1997 | ........... B60K/17/04 |
| FR | 2742703 A1 | * | 6/1997 | ........... B60K/06/04 |
| FR | 2 774 039 | | 7/1999 | |
| JP | A-8-183347 | | 7/1996 | |
| WO | WO 9620098 A1 | * | 7/1996 | ........... B60K/17/04 |

* cited by examiner

*Primary Examiner*—Joseph Waks
(74) *Attorney, Agent, or Firm*—Oliff & Berridge, PLC

(57) ABSTRACT

A hybrid drive apparatus formed from an engine, a generator, a differential gear mechanism linking the engine and the generator, an electric motor, and a differential apparatus. The power transmission system on the side of the engine that links the differential apparatus with the output element of the differential gear mechanism and the power transmission system on the side of the electric motor that links the differential apparatus with the electric motor are each formed from separate power transmission elements and are each linked to the differential apparatus at the most downstream point of the power transmission system of each. As a result, it is possible to easily alter the setting of the total gear ratio on the engine side by altering the meshing diameter of the power transmission elements without altering the mutual positions between the axes of the engine, electric motor, and differential apparatus. Moreover, the implementing of measures against noise is simplified because the upstream side of the power transmission system is formed separately.

71 Claims, 35 Drawing Sheets

HYBRID DRIVE APPARATUS

BACKGROUND OF THE INVENTION

1. Field of Invention

The invention relates to a hybrid drive apparatus. The hybrid drive apparatus uses an engine and an electric motor as power sources. In particular, the hybrid drive apparatus uses a drive link structure for linking the power transmission systems of an engine and an electric motor.

2. Description of Related Art

A hybrid drive apparatus that uses an engine (i.e. an internal combustion engine) and an electric motor as power sources transmits the power from the two systems to a differential apparatus to adapt a variety of power train structures. Japanese Patent Application Laid-Open (JP-A No. 8-183347) discloses a drive apparatus having a structure in which the output from the engine and the output from the electric motor are transmitted to a differential apparatus with an optional gear ratio set for the engine and electric motor. In this drive apparatus, the engine and generator are placed on a first axis, the electric motor is placed on a second axis, a counter shaft is placed on a third axis, and the differential apparatus is placed on a fourth axis. The engine and generator are linked to the countershaft via a differential gear mechanism and the electric motor and differential apparatus are linked directly to the countershaft. Because the power of the two systems is transmitted to the vehicle wheels via the countershaft, a counter driven gear (the third gear 32 in the terminology of the aforementioned publication) is engaged with a drive gear, (the first gear 15 in the terminology of the aforementioned publication) is drive linked to the engine and a drive gear (the second gear 27 in the terminology of the aforementioned publication) is drive linked to the motor with the outputs from both the engine and the motor are input to the countershaft at optionally set gear ratios for each.

However, the demands on the vehicle vary when using the engine in a hybrid drive apparatus. For example, some vehicles may emphasize fuel consumption, while some vehicles emphasize acceleration. It is thus necessary to set the total gear ratio from the engine to the wheels higher for the fuel consumption emphasis, and to lower this ratio for the acceleration emphasis. In order to respond to these demands in the above hybrid drive apparatus, the diameters of the gear pairs linking the differential gear mechanism and the countershaft are altered so as to alter the total gear ratio on the engine side. However, the diameter of the gear pairs linking the electric motor and the countershaft is altered. Thus, the gear ratio on the motor side is affected. Moreover, as a result of the diameter of the gears being altered, the center distance between the countershaft on the third axis and the differential apparatus on the fourth axis is also changed which requires an alteration in the configuration of the casing.

Further, the engine side drive gear and the motor side drive gear mesh simultaneously with the counter driven gear. Also, gear face precision between the engine side drive gear and the counter driven gear and between the motor side drive gear and the counter driven gear must be provided simultaneously, which requires a great deal of man-hours.

Moreover, because the meshing degree (noise frequency) is the same, not only is a louder gear noise generated, but it is impossible to determine from the differences in the noise frequency whether the meshing portion causing the noise is between the counter driven gear and the engine drive gear or between the counter driven gear and the motor drive gear. Thus, it is impossible to implement measures which will reduce the noise.

SUMMARY OF THE INVENTION

The invention provides a hybrid drive apparatus capable of allowing the optional setting and further altering of total gear ratios on the engine side and on the motor side without the axial positions of the engine and generator, the electric motor, and the differential apparatus being altered. The invention separately provides an apparatus that simplifies the noise reduction measures when gear noise is generated in the hybrid drive apparatus.

In various exemplary embodiments, the invention is a hybrid drive apparatus including an engine, a generator, a differential gear mechanism linking the engine and the generator, an electric motor, and a differential apparatus, in which an output element of the differential gear mechanism is drive linked to the differential apparatus via a power transmission system on the side of the engine and generator, and the electric motor is drive linked to the differential apparatus via a power transmission system on the side of the electric motor, wherein the engine and the generator and the differential gear mechanism are placed on a common axis and output shafts of the electric motor and the differential apparatus are each placed on their own different axes which are parallel to the common axis, and the power transmission system on the side of the engine and generator and the power transmission system on the side of the electric motor are each formed from separate power transmission elements, and both are drive linked at the most downstream ends of their respective power transmission systems with the differential apparatus.

Specifically, the power transmission system on the side of the engine and generator is formed from power transmission elements that drive link the output element of the differential gear mechanism and a differential input gear of the differential apparatus, and wherein the power transmission system on the side of the electric motor is formed from power transmission elements that drive link a rotor shaft of the electric motor and the differential input gear.

In the above structure, the differential input gear of the differential apparatus includes a first and a second differential input gear; the power transmission system on the side of the engine and generator is formed from power transmission elements that drive link the output element of the differential gear mechanism and the first differential input gear; and the power transmission system on the side of the electric motor is formed from power transmission elements that drive link the rotor shaft of the electric motor and the second differential input gear.

In various exemplary embodiments, the hybrid drive apparatus includes an engine, a generator, a differential gear mechanism linking the engine and the generator, an electric motor, and a differential apparatus, in which the output element of the differential gear mechanism is drive linked to the differential apparatus via a power transmission system on the side of the engine and generator, and the electric motor is drive linked to the differential apparatus via a power transmission system on the side of the electric motor, wherein the engine and the generator and the differential gear mechanism are placed on a common axis and output shafts of the electric motor and the differential apparatus are each placed on their own different axes which are parallel to the common axis, and wherein the power transmission system on the side of the electric motor is drive linked to the differential apparatus via the power transmission system on the side of the engine and generator.

Specifically, the power transmission system on the side of the engine and generator is formed from power transmission elements that drive link the output element of the differential gear mechanism and the differential input gear of the differential apparatus, and wherein the power transmission system on the side of the electric motor is formed from power transmission elements that drive link the rotor shaft of the electric motor and the output element of the differential gear mechanism.

Specifically, the power transmission system on the side of the engine and generator is formed from a counter drive gear linked to the output element of the differential gear mechanism and power transmission elements that drive link this counter drive gear and the differential input gear, and wherein the power transmission system on the side of the electric motor is formed from an electric motor output gear fixed to the rotor shaft of the electric motor power transmission elements that drive link the electric motor output gear and the counter drive gear.

In the above structure, the power transmission system on the side of the engine and generator is formed from a first counter drive gear linked to the output element of the differential gear mechanism and power transmission elements that drive link the first counter drive gear and the differential input gear, and wherein the power transmission system on the side of the electric motor is formed from an electric motor output gear fixed to the rotor shaft of the electric motor power transmission elements that drive link the electric motor output gear and a second counter drive gear linked to the output element of the differential gear mechanism.

Moreover, in the above structure, the power transmission system on the side of the electric motor includes a sprocket fixed to the rotor shaft of the electric motor; a sprocket linked to the output element of the differential gear mechanism; and a chain entrained between the two sprockets.

In various exemplary embodiments, the hybrid drive apparatus includes an engine, a generator, a differential gear mechanism linking the engine and the generator, an electric motor, and a differential apparatus, in which the output element of the differential gear mechanism is drive linked to the differential apparatus via a power transmission system on the side of the engine and generator, and the electric motor is drive linked to the differential apparatus via a power transmission system on the side of the electric motor, wherein the engine and the generator and the differential gear mechanism are placed on a common axis and output shafts of the electric motor and the differential apparatus are each placed on their own different axes which are parallel to the common axis, and wherein the power transmission system on the side of the engine and generator are drive linked to the differential apparatus via the power transmission system on the side of the electric motor.

Specifically, the power transmission system on the side of the electric motor is formed from power transmission elements drive linking the rotor shaft of the electric motor and the differential input gear of the differential apparatus, and the power transmission system on the side of the engine and generator is formed from power transmission elements that drive link the output element of the differential gear mechanism and the rotor shaft of the electric motor.

More specifically, the power transmission system on the side of the electric motor is formed from the electric motor output gear fixed to the rotor shaft of the electric motor and power transmission elements drive linking the electric motor output gear and the differential input gear, and the power transmission system on the side of the engine and generator is formed from power transmission elements that drive link the output element of the differential gear mechanism and the electric motor output gear.

In the above structure, the power transmission system on the side of the electric motor is formed from the first electric motor output gear fixed to the rotor shaft of the electric motor and power transmission elements drive linking the first electric motor output gear and the differential input gear, and the power transmission system on the side of the engine and generator is formed from power transmission elements that drive link the output element of the differential gear mechanism and the second electric motor output gear that is fixed to the rotor shaft of the electric motor.

Moreover, in the above structure, the power transmission system on the side of the engine and generator includes a sprocket linked to the output element of the differential gear mechanism; a sprocket fixed to the rotor shaft of the electric motor; and a chain entrained between the two sprockets.

In various exemplary embodiments, the hybrid drive apparatus includes an engine, a generator, a differential gear mechanism linking the engine and the generator, and an electric motor, in which an output element of the differential gear mechanism is drive linked to the vehicle wheels via a power transmission system on the side of the engine and generator, and the electric motor is drive linked to the vehicle wheels via a power transmission system on the side of the electric motor, wherein the hybrid drive apparatus is provided with output shafts drive linking each of the power transmission systems and the vehicle wheels, and the power transmission system on the side of the engine and generator is formed from power transmission elements drive linking the output element of the differential gear mechanism and a first output gear fixed to an output shaft, and the power transmission system on the side of the electric motor is formed from power transmission elements drive linking the rotor shaft of the electric motor and a second output gear fixed to an output shaft.

In various exemplary embodiments, the hybrid drive apparatus includes an engine, a generator, a differential gear mechanism linking the engine and the generator, and an electric motor, in which an output element of the differential gear mechanism is drive linked to the vehicle wheels via a power transmission system on the side of the engine and generator, and the electric motor is drive linked to the vehicle wheels via a power transmission system on the side of the electric motor, wherein the power transmission system on the side of the engine and generator is formed from a first counter drive gear linked to an output element of the differential gear mechanism and power transmission elements drive linking the first counter drive gear and the vehicle wheels, the power transmission system on the side of the electric motor is formed from an electric motor output gear fixed to the rotor of the electric motor and power transmission elements drive linking the electric motor output gear and a second counter drive gear linked to an output element of the differential gear mechanism, and the power transmission system on the side of the electric motor is drive linked to the vehicle wheels via the power transmission system on the side of the engine and generator.

In various exemplary embodiments, the hybrid drive apparatus includes an engine, a generator, a differential gear mechanism linking the engine and the generator, and an electric motor, in which an output element of the differential gear mechanism is drive linked to the vehicle wheels via a power transmission system on the side of the engine and generator, and the electric motor is drive linked to the vehicle wheels via a power transmission system on the side of the electric motor, wherein the power transmission system on the side of the electric motor is formed from a first electric motor output gear fixed to the rotor of the electric motor and power transmission elements drive linking the first electric motor output gear and the vehicle wheels, the power transmission system on the side of the engine and generator is formed from power transmission elements drive linking the output element of the differential gear mechanism and a second electric motor output gear fixed to the rotor shaft of the electric motor, and the power transmission system on the side of the engine and generator is drive linked to the vehicle wheels via the power transmission system on the side of the electric motor.

In the structure of each exemplary aspect of the invention as mentioned above, an idler gear may constitute the power transmission element.

In the structure of each exemplary aspect of the invention as mentioned above, a counter reduction mechanism may constitute the power transmission element as a counter reduction gear mechanism.

In the structure of each exemplary aspect of the above invention as mentioned above, it is possible to constitute the power transmission element in one of the power transmission systems as an idle gear, and to constitute the power transmission element in the other power transmission system as a counter reduction gear mechanism.

In the structure of each exemplary aspect of the above invention as mentioned above, a coaxial reduction mechanism is inserted in at least one of the power transmission systems.

BRIEF DESCRIPTION OF THE DRAWINGS

This invention will be described with reference to the drawings in which.

DETAILED DESCRIPTION OF PREFERRED EMBODIMENTS

Figure 1:
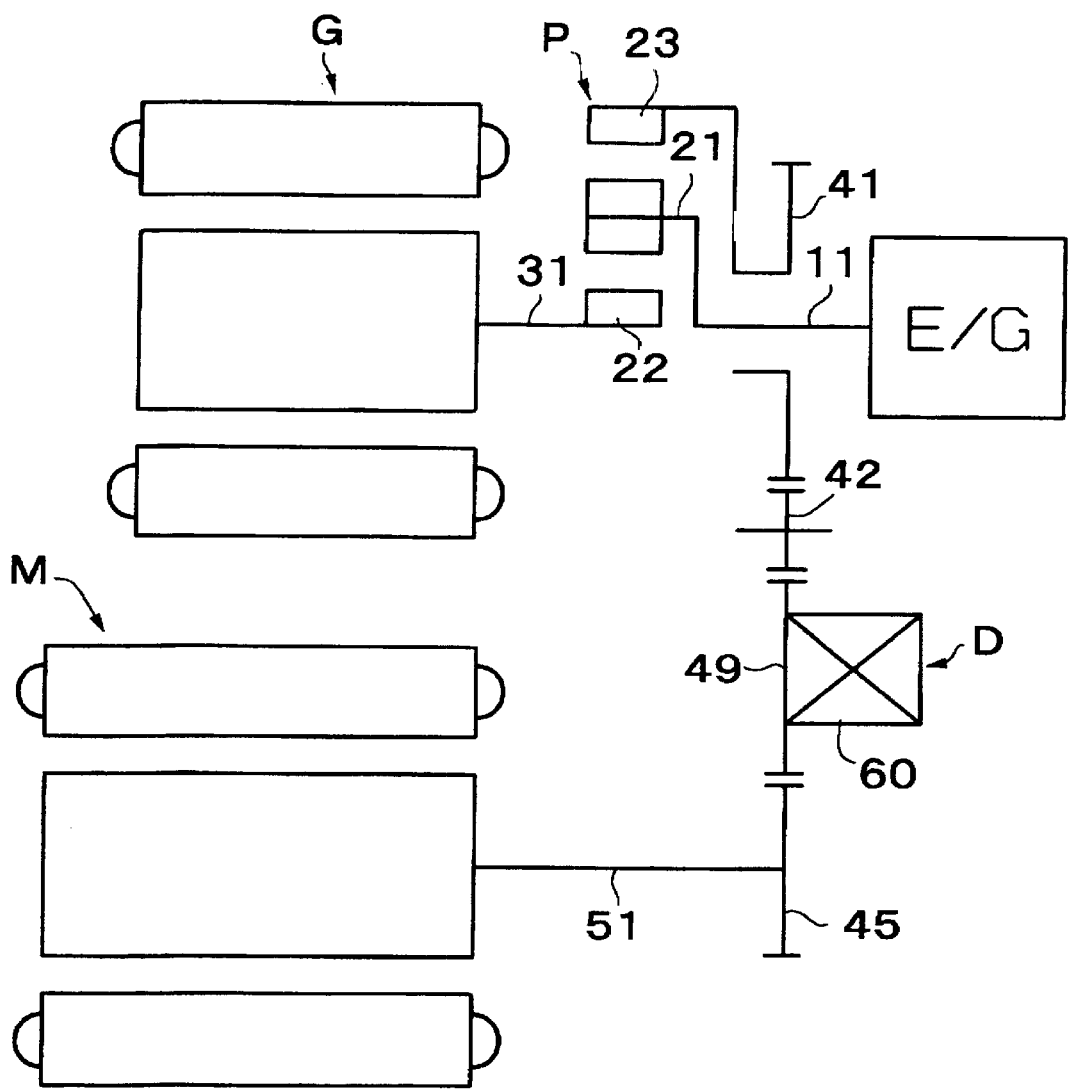
FIG. 1 is a schematic view of the hybrid drive apparatus according to the first exemplary embodiment of the invention.
Figure 2:
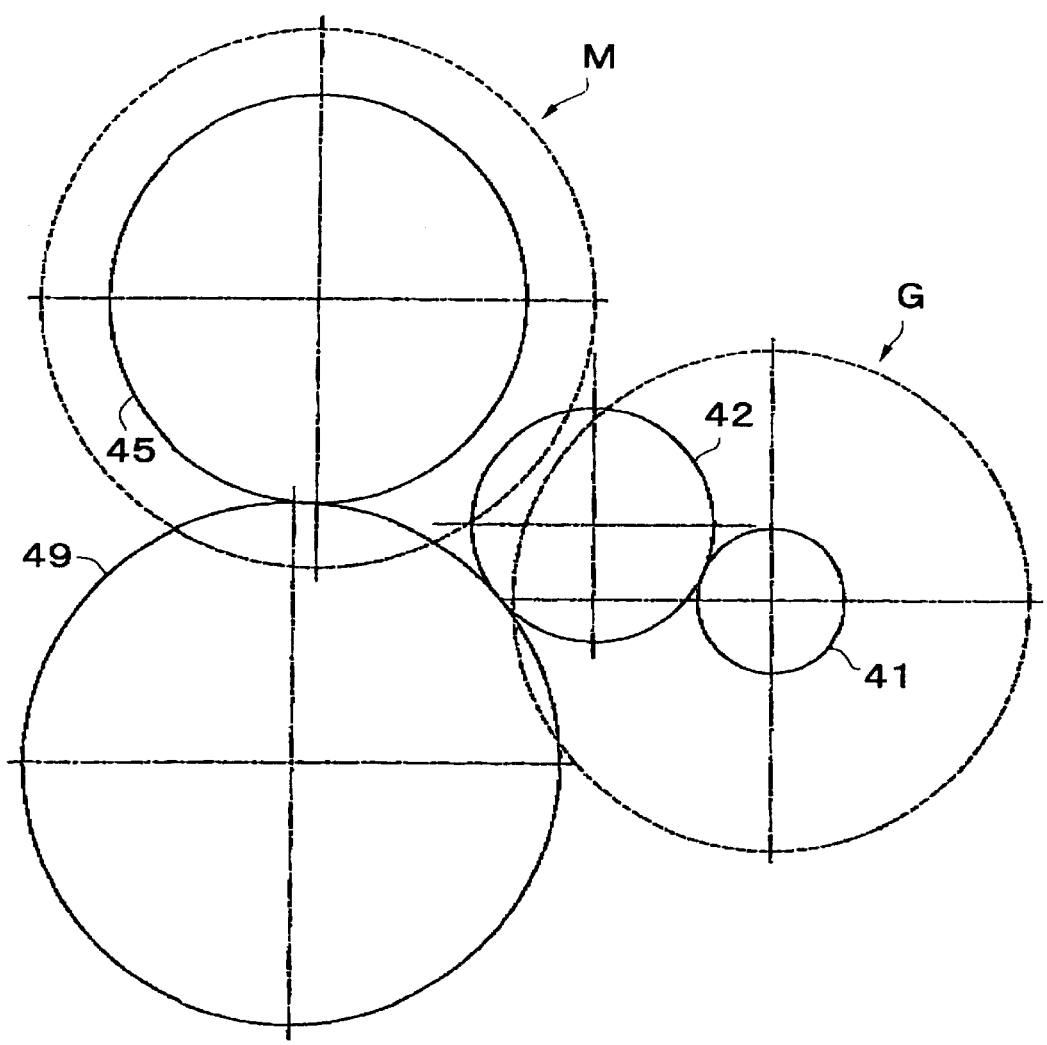
FIG. 2 is an arrangement diagram showing the meshing relationships between each gear of the power transmission systems of the first exemplary embodiment.

FIG. 1 shows a schematic view expanded between the axes of a power train of the hybrid drive apparatus of the first exemplary embodiment to which the invention has been applied. The apparatus is provided with an engine E/G, a generator G, a differential gear mechanism P linking the engine E/G and the generator G, an electric motor M, and a differential apparatus D. The basic structure is formed by the output element of the differential gear mechanism P, which includes a single pinion structure planetary gear set, being drive linked to the differential apparatus D via the transmission system on the engine and generator power side (hereinafter "engine power transmission system"). As shown in FIG. 2, the drive apparatus in this exemplary embodiment is a transverse type drive apparatus for a front engine front drive (FF) vehicle or rear engine rear drive (RR) vehicle in which the engine E/G, the generator G, and the differential gear mechanism P are placed on a common axis, while the electric motor M and the output shaft of the differential apparatus D are placed on different axes which are parallel with the above common axis.

In the drive apparatus, the engine power transmission system and the electric motor transmission system are each formed from separate power transmission elements and the differential apparatus D is connected at the most downstream point of the power transmission flow of each power transmission system.

The output shaft 11 of the engine E/G is linked to a carrier 21 of the planetary gear forming the differential gear mechanism P so that the engine E/G is linked with the generator G and the engine side power transmission system. The output shaft 31 of the generator G is linked to a sun gear 22 of the differential gear mechanism P so that the generator G is linked with the engine E/G and engine side power transmission system. As a result, the ring gear 23 of the differential gear mechanism P functions as an output element for transmitting the power of the engine E/G to the engine side power transmission system The engine side power transmission system is formed from power transmission elements linking the ring gear 23, which is the output element of the differential gear mechanism P, to a differential ring gear 49 fixed to the differential case 60 as an input gear of the differential apparatus D. The electric motor side power transmission system is formed from power transmission elements linking a rotor shaft 51 of the electric motor M with the differential ring gear 49 of the differential apparatus D.

The power transmission elements of the engine side power transmission system in the exemplary embodiment is composed of a counter drive gear 41 linked to the ring gear 23 and an idle gear 42 that meshes with the counter drive gear 41 and the differential ring gear 49. The power transmission elements of the electric motor side power transmission system includes an electric motor output gear 45 fixed to the rotor shaft 51. The electric motor output gear 51 meshes with the differential ring gear 49 of the differential apparatus D.

As can be seen from the actual positional relationships of the axes shown in FIG. 2, the drive apparatus is formed with the engine E/G (see FIG. 1) and the generator G both on the same axis 1, the electric motor M on the second axis, and the differential apparatus D on the third axis, with the axes parallel with each other. The counter drive gear 41 on the first axis meshes with the differential ring gear 49 of the differential apparatus D on the third axis via the idle gear 42. The electric motor output gear 45 on the second axis meshes with the same differential ring gear 49 at a different position in the peripheral direction.

In a hybrid drive apparatus having the above described structure, in contrast to the electric motor M and the differential apparatus D directly linked in the power transmission and in spite of being via the electric motor side power transmission system, the engine E/G and the generator G are indirectly linked to each other and to the differential apparatus D via the differential gear mechanism P in the power transmission. As a result, by adjusting the power generation load of the generator G relative to the ring gear 23 that receives the traveling load of the vehicle via the differential apparatus D, traveling becomes possible in which the proportion of the output from the engine E/G that is used as the driving force and the proportion of the output of the engine E/G that is used for energy generation (i.e. charging the battery) have been suitably adjusted. Moreover, by driving the generator G as an electric motor, the reaction force that acts on the carrier 21 is inverted, therefore, by anchoring the carrier 21 on the drive apparatus casing at that time using some appropriate unillustrated means, the output of the generator G can be transmitted to the ring gear 23, and strengthening of the drive force (parallel mode travel) when the vehicle starts to move using the simultaneous outputs of the electric motor M and the generator G is possible.

Next, a description will be given of the altering of the engine side gear ratio. As can be seen from the actual relationships of the axis position and the gear meshing shown in FIG. 2, the differential ring gear 49 and the counter drive gear 41, having a predetermined gear ratio, are formed separately from the electric motor side power transmission system formed from the differential ring gear 49 and the output gear 45 having another predetermined gear ratio in the same way. If the diameter of the counter drive gear 41 is altered in response to a request to alter a gear ratio, the axial position of the idle gear 42 that meshes with the counter drive gear 41 needs to be altered relative to the counter drive gear 41 and differential ring gear 49 as shown in FIG. 2. However, there is no need to alter either the diameter or the axial position of the other gears.

In this way, according to the drive apparatus, the output on the engine E/G side and the output on the electric motor M side are completely independent. It is, thus, possible to freely set the total gear ratio on the engine side. When the setting is made, there is no change in the distance between the axes of each of the main gears. Thus, it is possible to standardize the casing.

Moreover, according to the drive apparatus, there is no merging of the power transmitted via the engine side power transmission system and the electric motor side power transmission system before the differential apparatus. It is, thus, easy to pinpoint the noise generating portion when gear noise that needs to be reduced is generated.

Figure 3:
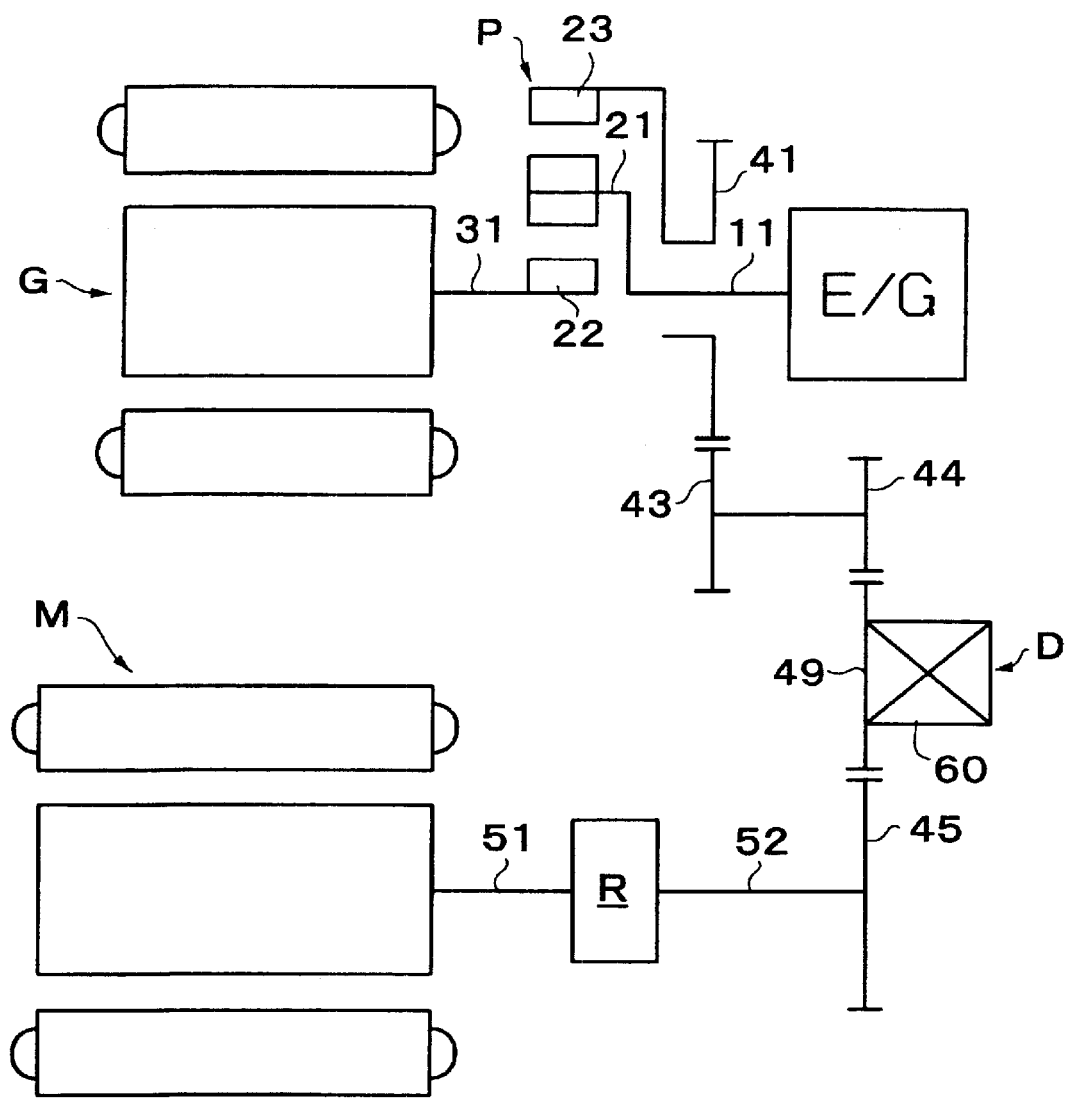
FIG. 3 is a schematic view of the hybrid drive apparatus according to the second exemplary embodiment of the invention.
Figure 4:
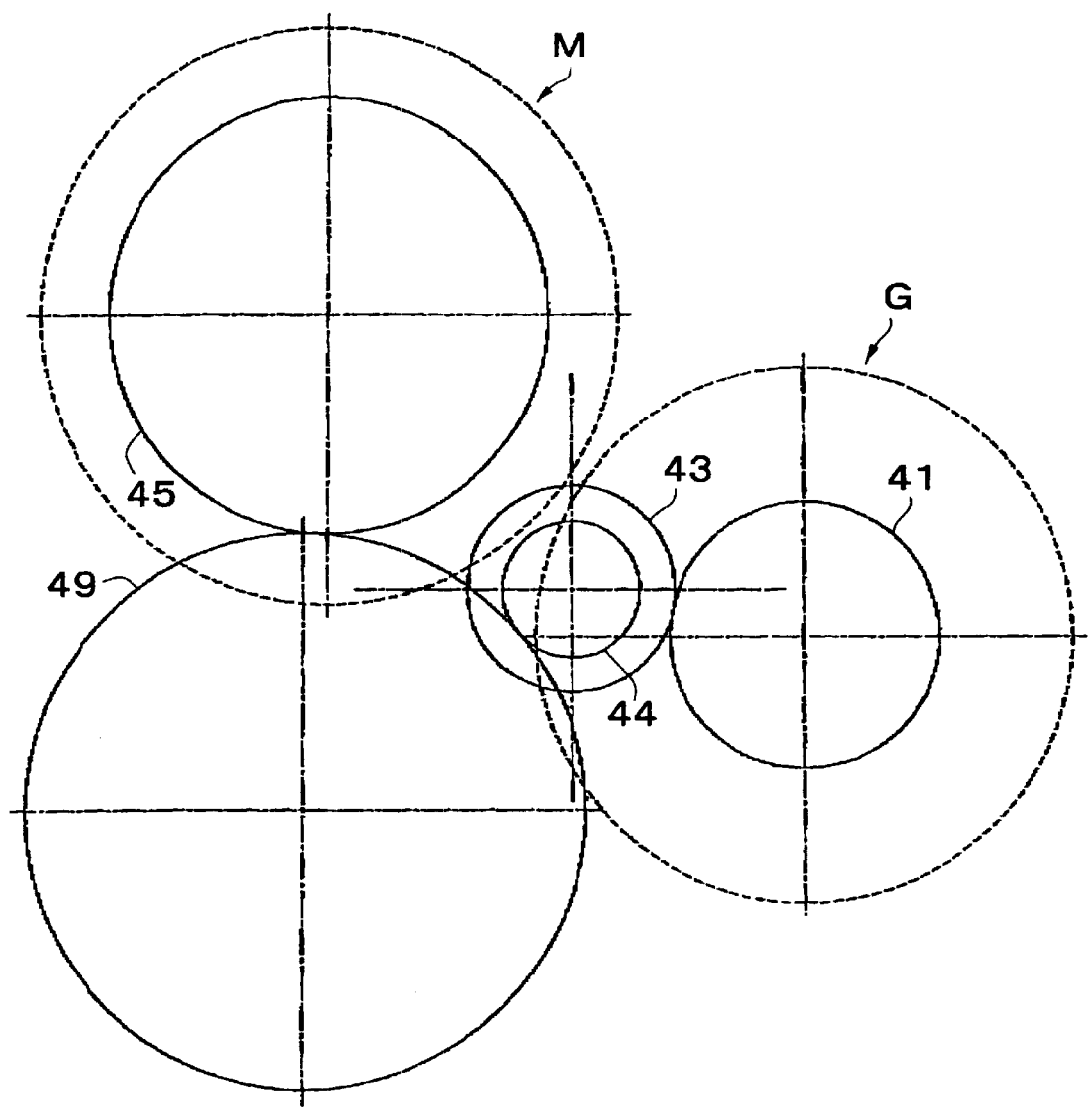
FIG. 4 is an arrangement diagram showing the meshing relationships between each gear of the power transmission systems of the second exemplary embodiment.

Next, FIGS. 3 and 4 show the second exemplary embodiment. In this exemplary embodiment, the power transmission elements of the engine side power transmission system form a counter reduction gear mechanism comprising a counter drive gear 41 linked to a ring gear 23, a counter driven gear 43 that meshes with the counter drive gear 41, and a pinion gear 44 that is linked to the counter driven gear 43. The pinion gear 44 also meshes with the differential ring gear 49. In contrast, a coaxial reduction mechanism R is inserted in the power transmission system on the electric motor side. There is no particular specific structure illustrated for the coaxial reduction mechanism R, however, an optional coaxial reduction mechanism such as is typified by a planetary gear set is used. In this case, the input element of the coaxial reduction mechanism R is connected to a rotor shaft 51 and the shaft 52. The shaft 52 is linked to the output element of the coaxial reduction mechanism R and with an output gear 45 that meshes with the differential ring gear 49. As a result, the power transmission elements of the electric motor side power transmission system, in this case, include the coaxial reduction mechanism R and the output gear 45. The rest of the structure is substantially the same as in the first exemplary embodiment and, therefore, in the following description, the relevant elements are given the same reference symbols. Note that this point applies for all of the exemplary embodiments to follow.

In the above form, the gear pair formed from the counter driven gear 43 and the counter drive gear 41, which have a predetermined gear ratio, are formed separately from the gear pair formed from the differential ring gear 49 and the pinion gear 45, which have another predetermined gear ratio. If the diameter of the counter drive gear 41 is altered in response to a request to alter a gear ratio, the diameter of the counter driven gear 43 that meshes with the drive gear 41 needs to be altered. There is, however, no need to alter the diameters of the other gears. Moreover, in this case as well, as this gear ratio alteration does not affect any of the other gear pairs, the position of the counter reduction shaft is unchanged. Furthermore, in this case, by altering the reduction ratio of the coaxial reduction mechanism R placed on the electric motor side power transmission system, the gear ratio on the electric motor side can be freely set without altering the diameter and axial positions of the other gears. As a result, the same effects as in the first exemplary embodiment can be achieved with this drive apparatus.

Figure 5:
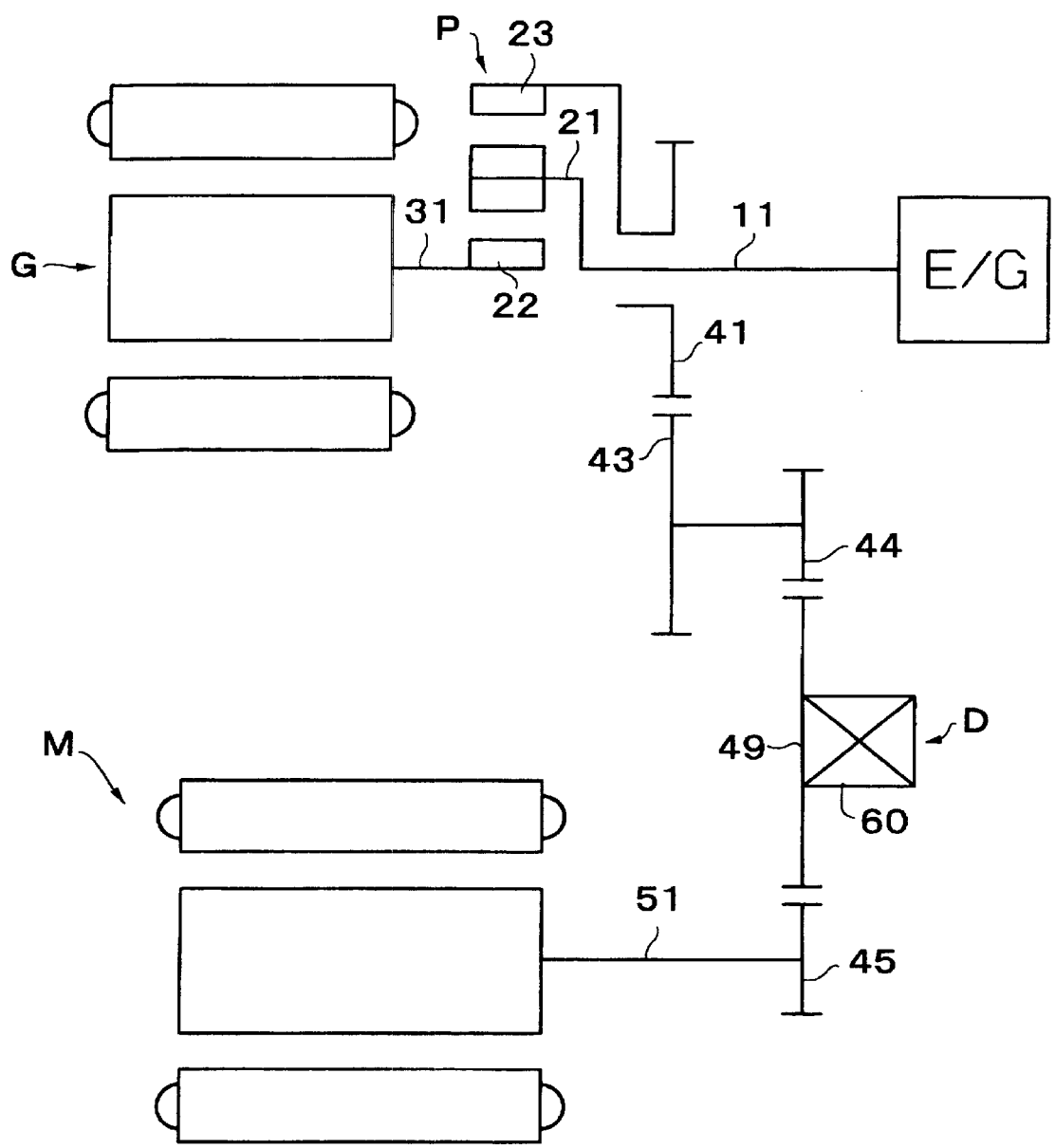
FIG. 5 is a schematic view of the hybrid drive apparatus according to third exemplary embodiment of the invention.

However, if an alteration of the gear ratio on the electric motor side is not used, it is possible to simplify the power transmission system on the electric motor side. FIG. 5 is a schematic view showing the structure of the power train of the third exemplary embodiment when an alteration of the gear ratio of the electric motor side is not used. The axial positional relationships in this form are exactly the same as those for the second exemplary embodiment and can be illustrated by referring to FIG. 4. In this form, the coaxial reduction mechanism R of the electric motor side power transmission system is eliminated. The rest of the structure is the same as in the second exemplary embodiment.

Figure 6:
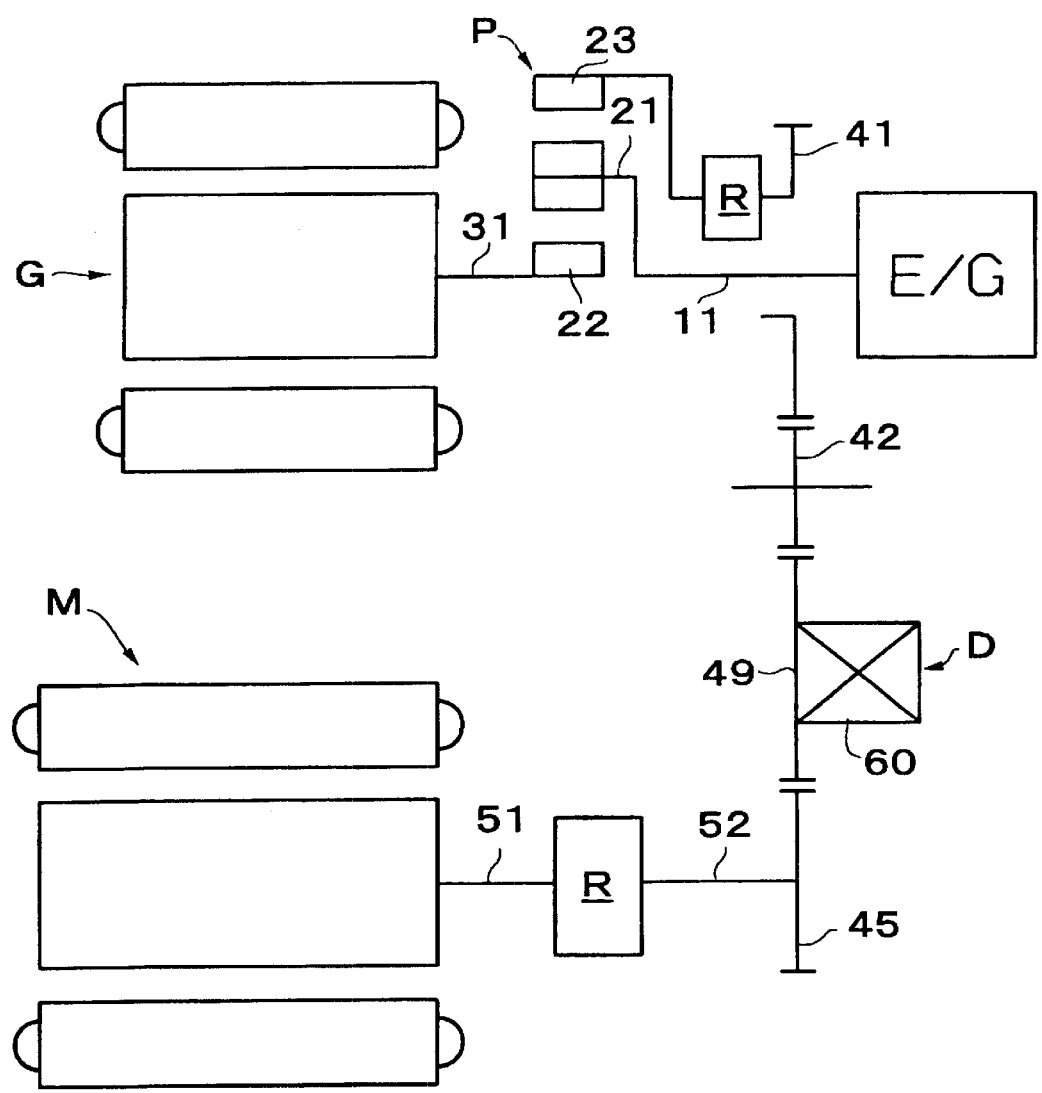
FIG. 6 is a schematic view of the hybrid drive apparatus according to the fourth exemplary embodiment of the invention.
Figure 7:
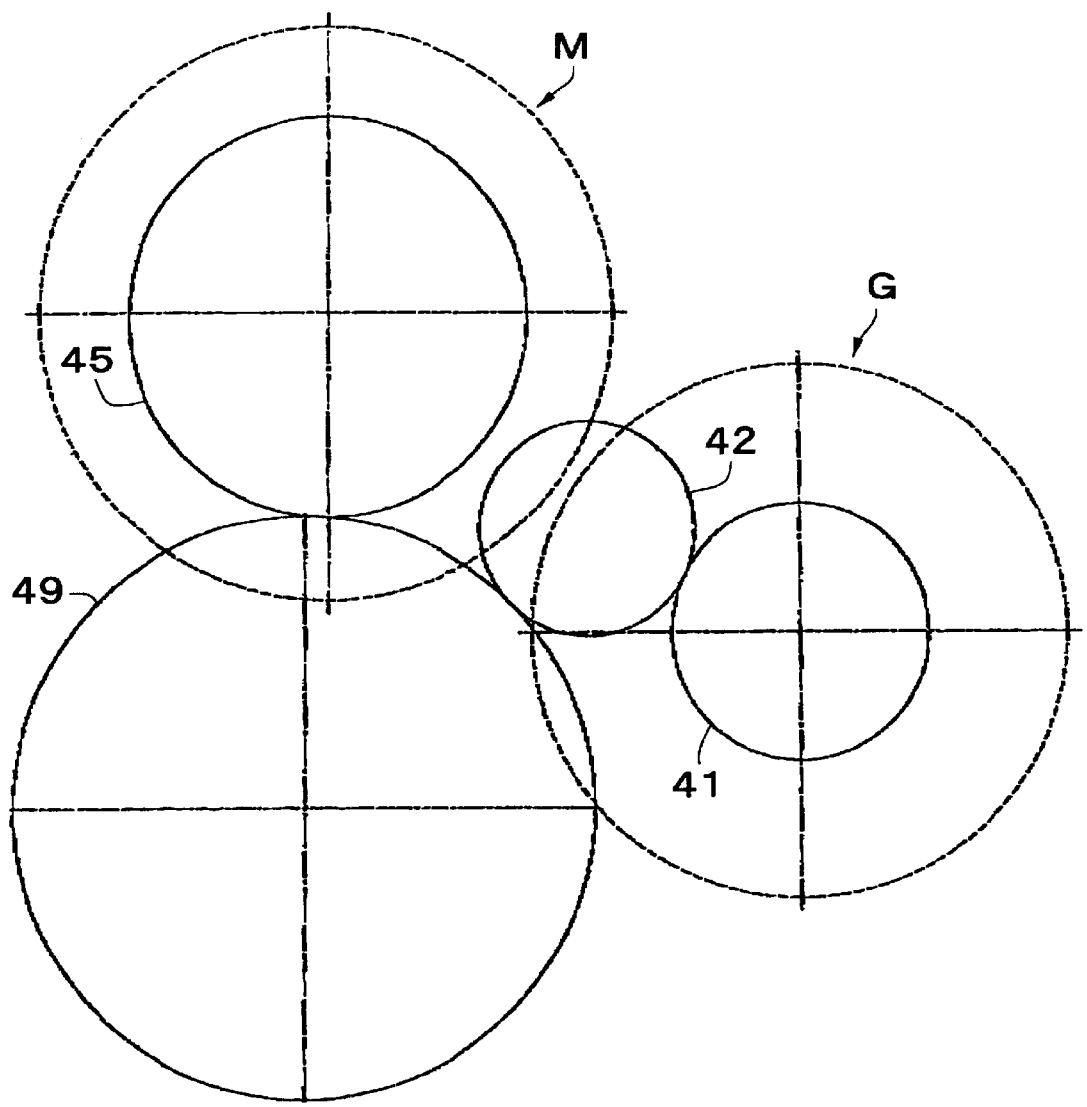
FIG. 7 is an arrangement diagram showing the meshing relationships between each gear of the power transmission systems of the fourth exemplary embodiment.

Next, FIGS. 6 and 7 show the fourth exemplary embodiment. In this exemplary embodiment, a structure is employed in which the transmission elements of the engine side power transmission system are composed of the counter drive gear 41 and the idle gear 42, in the same way as in the first exemplary embodiment, and a coaxial reduction mechanism R is inserted between the counter drive gear 41 and the ring gear 23 as an output element of the differential gear mechanism P. The same apparatus as is used for the coaxial reduction mechanism on the electric motor side in the second exemplary embodiment can be used for the coaxial reduction mechanism R. In addition, the electric motor side power transmission system is the same as that used in the second exemplary embodiment.

When this type of structure is employed, it is possible to alter the gear ratio on the engine side without affecting the gear ratio on the electric motor side, by altering the reduction ratio of the coaxial reduction mechanism R inserted between the ring gear 23 and the counter drive gear 41 and without needing to alter the meshing diameter of the idle gear 42 and the counter drive gear 41, as in the first exemplary embodiment. The complete reverse of this can also be applied to the gear ratio on the electric motor side.

Figure 8:
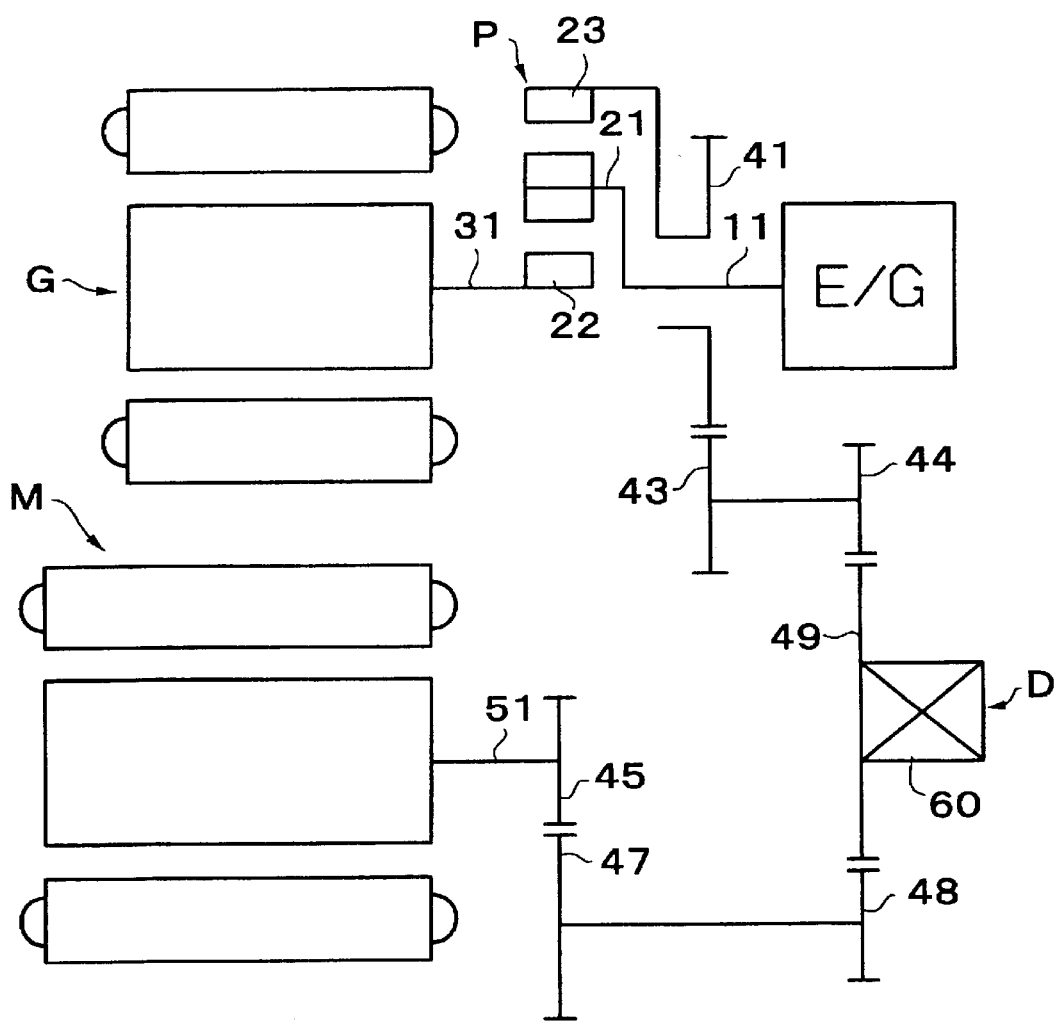
FIG. 8 is a schematic view of the hybrid drive apparatus according to the fifth exemplary embodiment of the invention.
Figure 9:
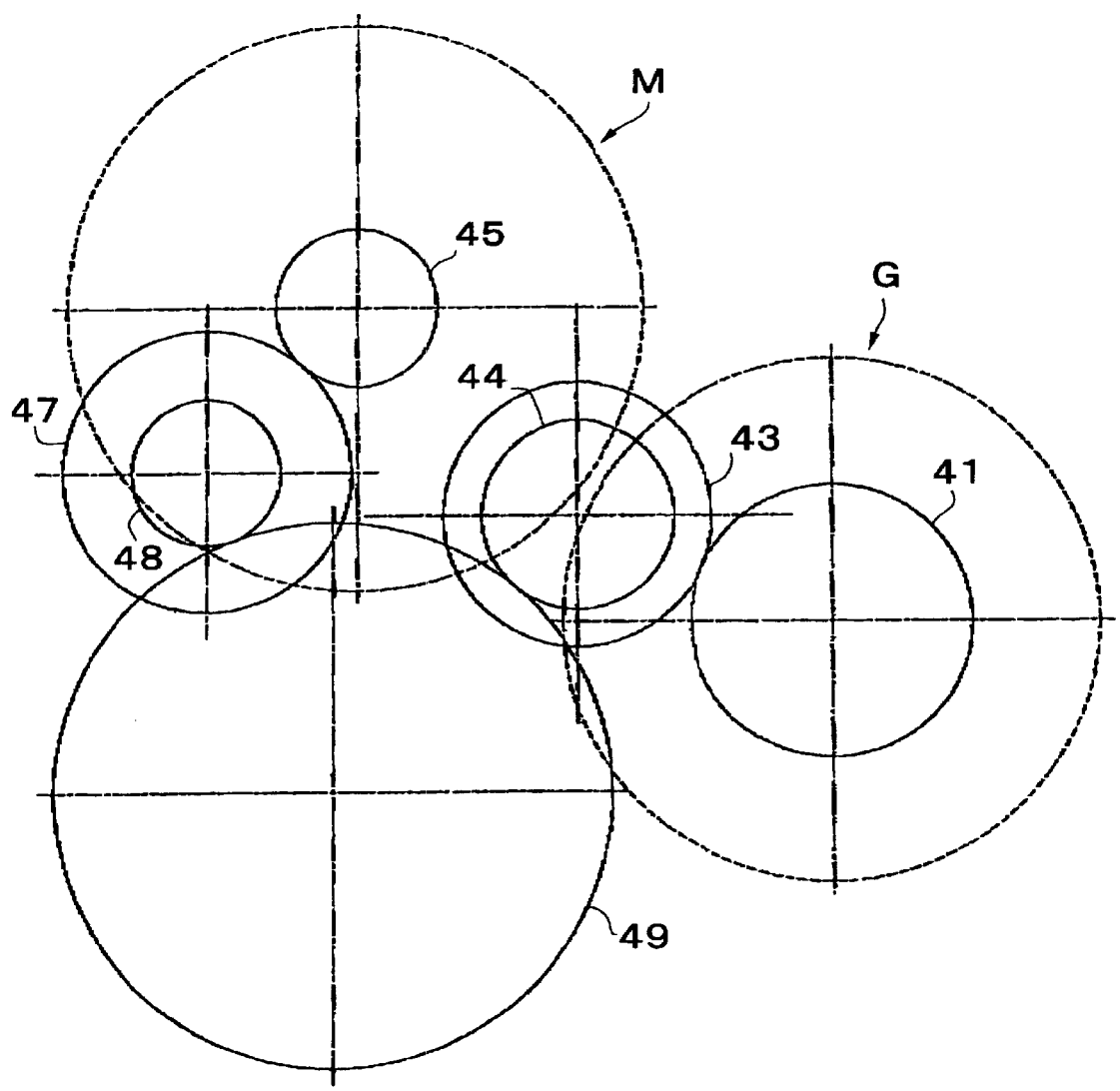
FIG. 9 is an arrangement diagram showing the meshing relationships between each gear of the power transmission systems of the fifth exemplary embodiment.

Next, FIGS. 8 and 9 show the fifth exemplary embodiment. In this exemplary embodiment, a structure is employed in which the transmission elements of the engine side power transmission system form a counter reduction gear mechanism composed of a counter drive gear 41, a counter driven gear 43 that meshes with the counter drive gear 41, and a pinion gear 44 that is linked to the counter driven gear 43 and meshes with a differential ring gear 49. The transmission elements of the electric motor side power transmission system form a counter reduction gear mechanism composed of an electric motor output gear 45 fixed to a rotor shaft 51. A counter driven gear 47 meshes with the electric motor output gear 45 and a pinion gear 48, that is linked to the counter driven gear 47, and meshes with a differential ring gear 49.

When this type of structure is employed, it is possible to alter the gear ratio on the engine side by altering the meshing diameter of the counter drive gear 41 and the counter driven gear 43 and to alter the gear ratio on the electric motor side by altering the meshing diameter of the output gear 45 and the counter driven gear 47 without affecting the mutual gear ratio between the two.

Figure 10:
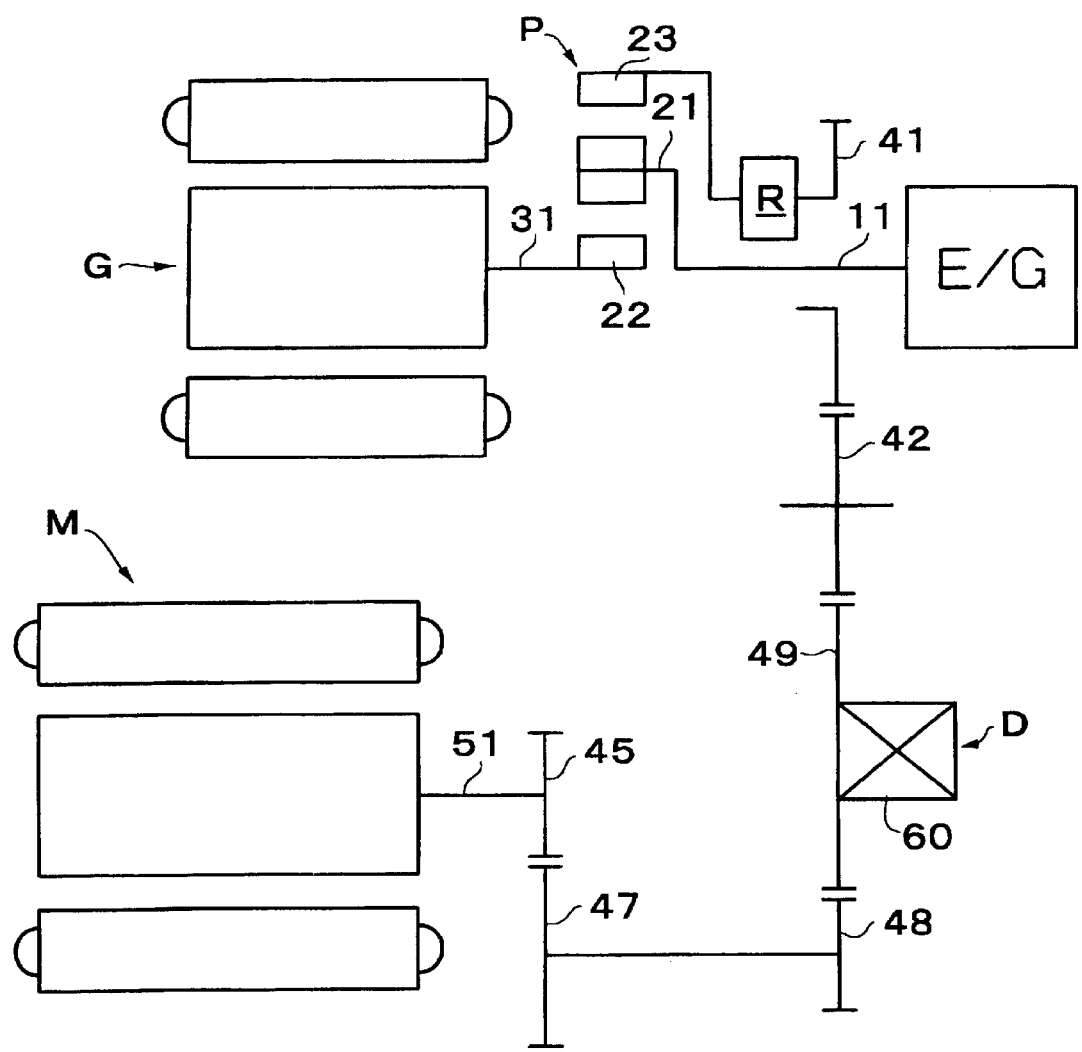
FIG. 10 is a schematic view of the hybrid drive apparatus according to the sixth exemplary embodiment of the invention.
Figure 11:
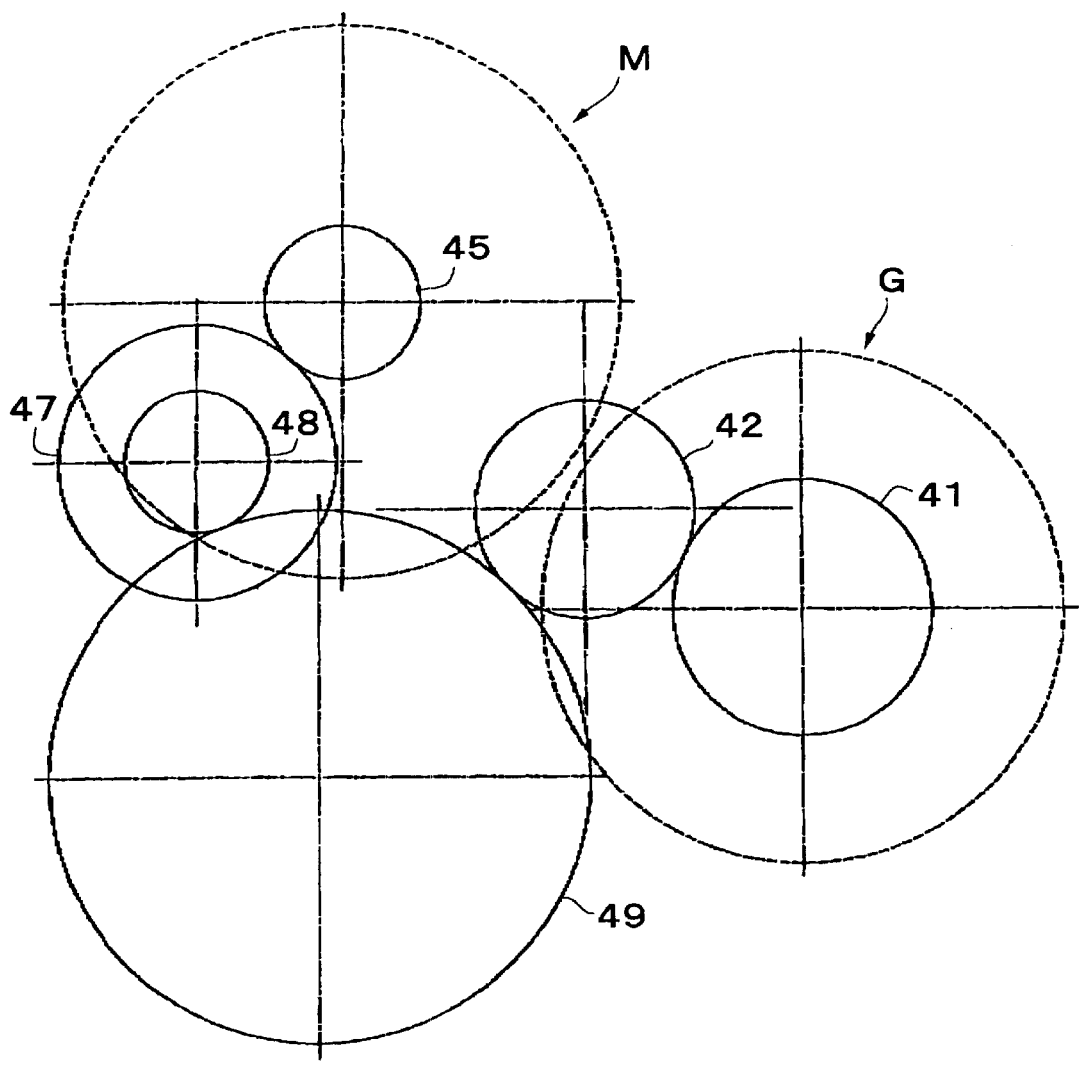
FIG. 11 is an arrangement diagram showing the meshing relationships between each gear of the power transmission systems of the sixth exemplary embodiment.

Next, FIGS. 10 and 11 show the sixth exemplary embodiment. In this exemplary embodiment, a structure is employed in which the power transmission elements of the engine side power transmission system in the fifth exemplary embodiment are replaced by the power transmission elements of the engine side power transmission system in the previous fourth exemplary embodiment, namely, a structure in which a coaxial reduction mechanism R is inserted between the counter drive gear 41 and the ring gear 23 as an output element of the differential gear mechanism P. As a result, the power transmission elements of the engine side power transmission system in this case is composed of the three elements of the coaxial reduction mechanism R, the counter drive gear 41, and the idle gear 42.

When this type of structure is employed, it is possible to alter the gear ratio on the engine side by altering the reduction ratio of the coaxial reduction mechanism R or by altering the diameter of the counter drive gear 41 relative to the differential ring gear 49 or by altering both. It is further possible to alter the gear ratio on the electric motor side by altering the meshing diameter of the electric motor output gear 45 and the counter driven gear 47 without affecting the mutual gear ratio between the two.

Figure 12:
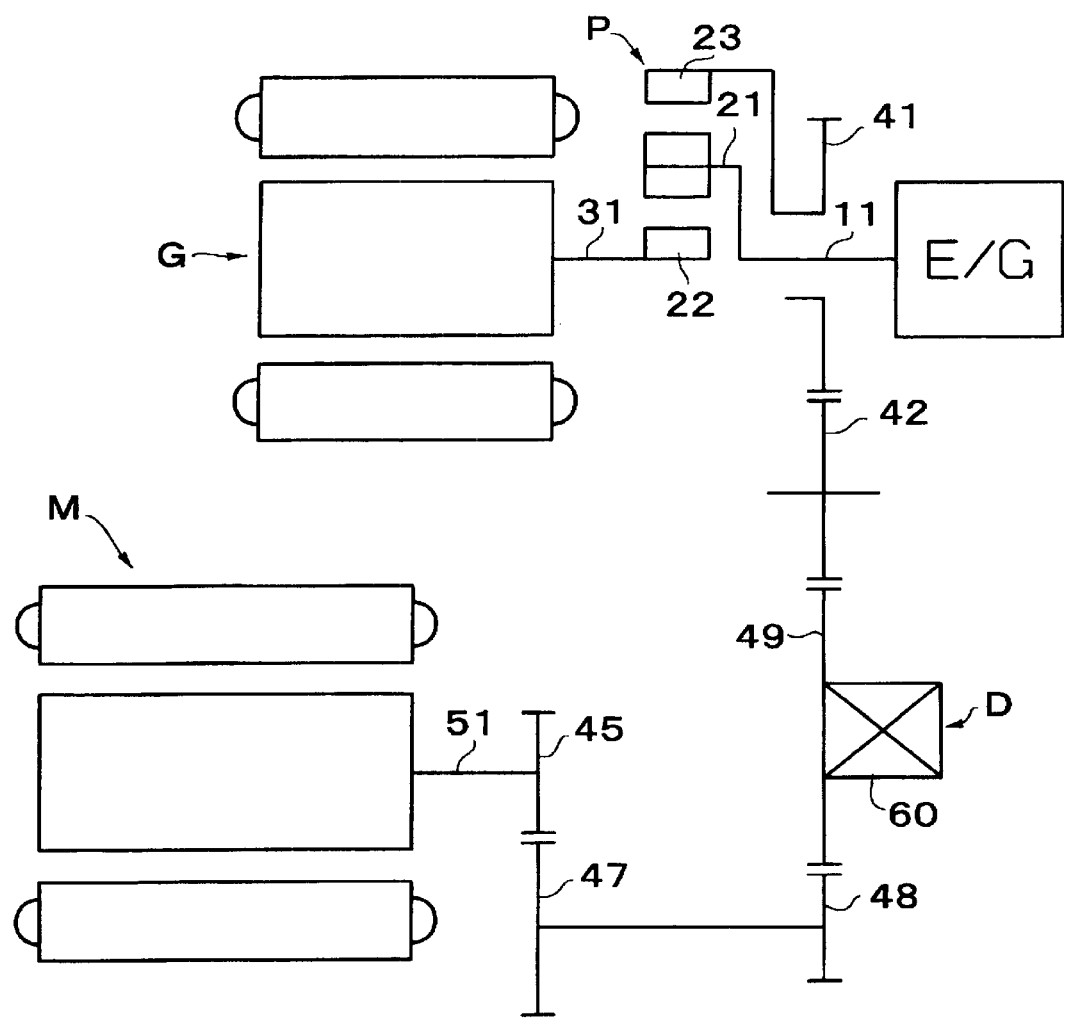
FIG. 12 is a schematic view of the hybrid drive apparatus according to the seventh exemplary embodiment of the invention.

Next, FIG. 12 shows the seventh exemplary embodiment. Because the axial positional relationships in this form are exactly the same as those in the sixth exemplary embodiment, they can be illustrated by referring to FIG. 11. In this form, in contrast to the sixth exemplary embodiment, a structure is employed in which the coaxial reduction mechanism R that was inserted between the counter drive gear 41 and the ring gear 23 as an output element of the differential gear mechanism P is eliminated.

When this type of structure is employed, it is possible to alter the gear ratio on the engine side by altering the diameter of the counter drive gear 41 relative to the differential ring gear 49 and to alter the gear ratio on the electric motor side by altering the meshing diameter of the counter driven gear 47 and the electric motor output gear 45 without affecting the mutual gear ratio between the two.

It should be noted that in each of the above exemplary embodiments, while the engine side power transmission system and the electric motor side power transmission system are formed as separate systems, a form is employed in which they ultimately merge on the power transmission flow at the common differential ring gear 49. However, it is also possible to separate the ultimate merging section as a possible gear noise counter measure. Three examples of this exemplary embodiment will be hereinafter described.

Figure 13:
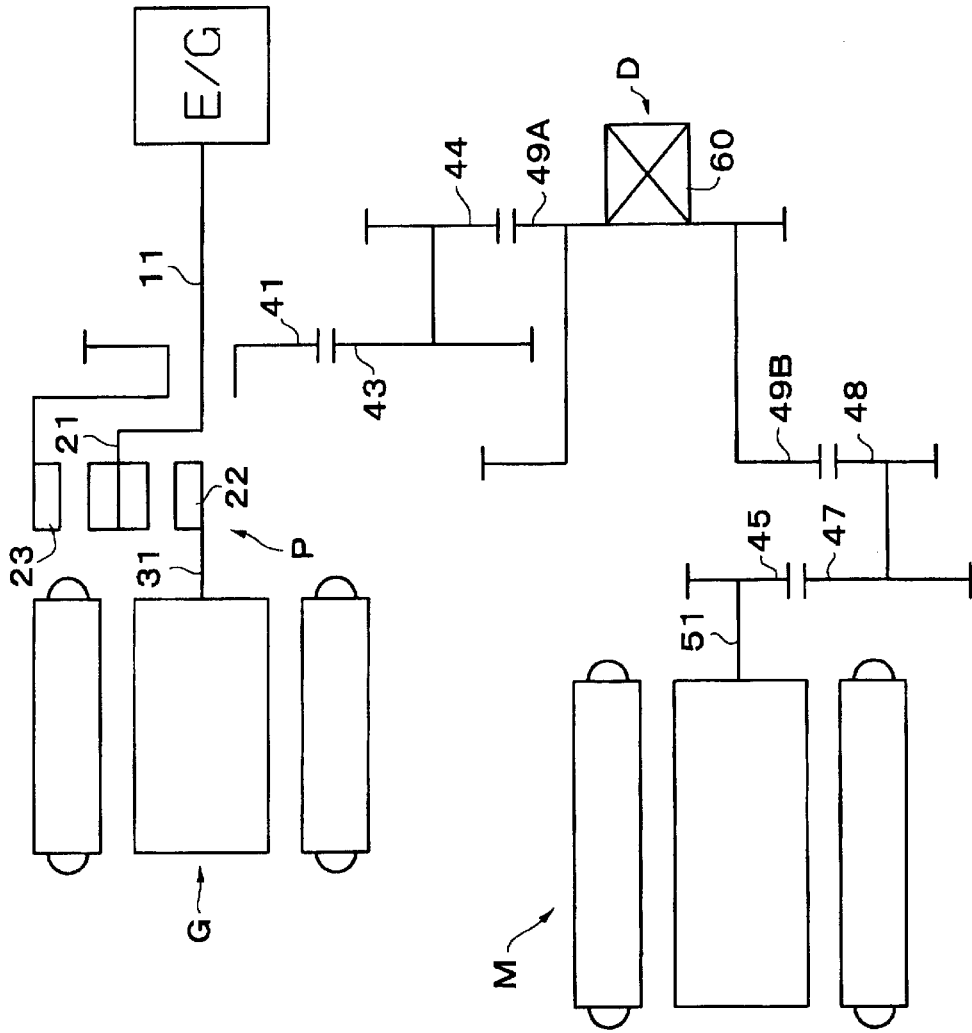
FIG. 13 is a schematic view of the hybrid drive apparatus according to the eighth exemplary embodiment of the invention.

In the eighth exemplary embodiment, the power train structure shown in FIG. 13, is similar to the train structure shown in the fifth exemplary embodiment in FIGS. 8 and 9. The differential ring gear 49 of the differential apparatus D is formed from a first and second differential ring gear 49A and 49B. The engine side power transmission system is formed from power transmission elements in which the first differential ring gear 49A is drive linked with the output element 23 of the differential gear mechanism P. Meanwhile the electric motor side power transmission system is formed from power transmission elements in which the second differential ring gear 49B is drive linked with the rotor shaft 51 of the electric motor M.

When this type of structure is employed, it is possible to make each of the meshings of the meshing portions of all the power transmission elements throughout the entire power train be meshings between different pairs of gears. The frequency of the noise that is generated by each meshing portion is different, thus simplifying the counter measures used against generated noise.

Figure 14:
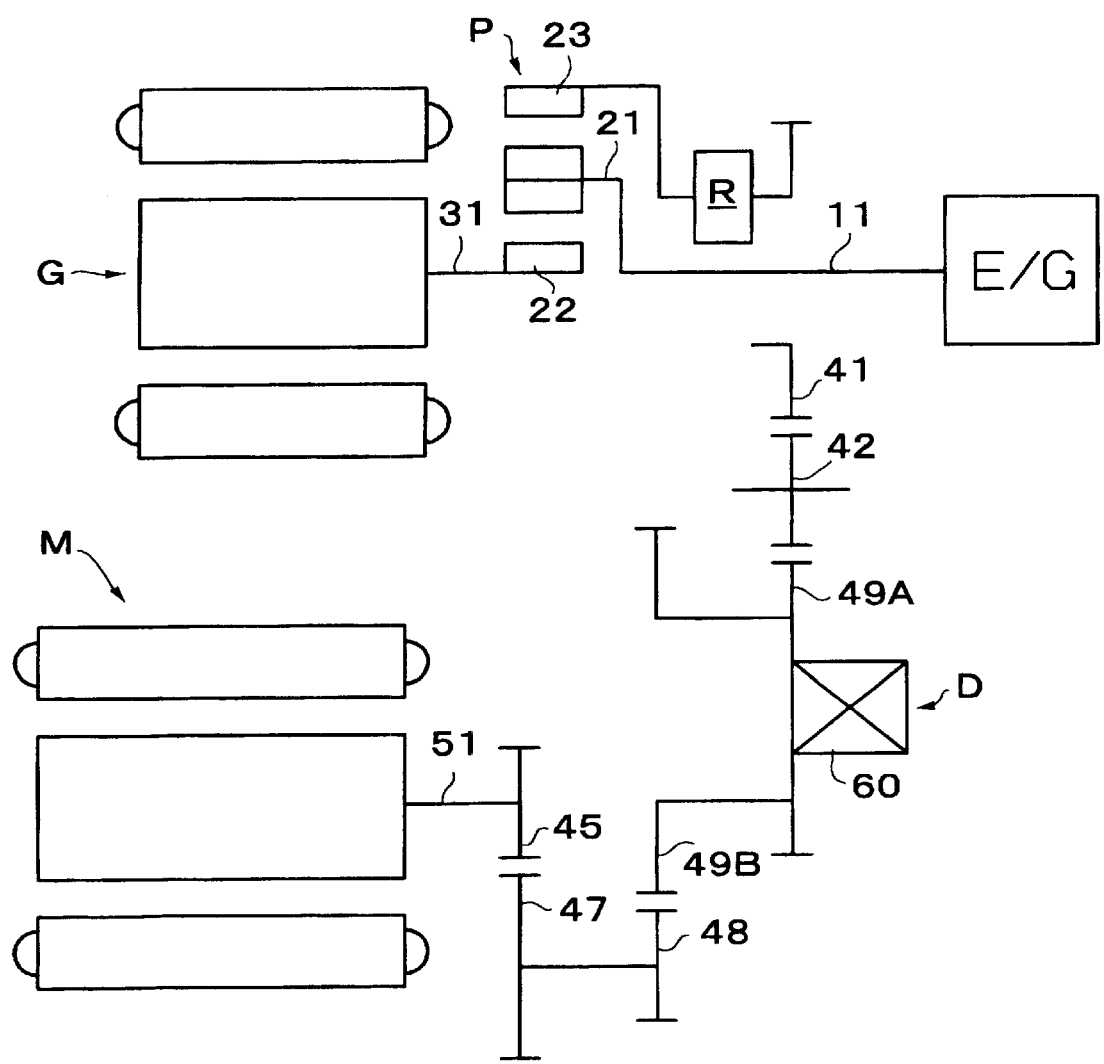
FIG. 14 is a schematic view of the hybrid drive apparatus according to the ninth exemplary embodiment of the invention.

In the ninth exemplary embodiment, the power train structure shown in FIG. 14 is similar to the train structure shown in the sixth exemplary embodiment in FIGS. 10 and 11. The differential ring gear is formed from a first and second differential ring gear 49A and 49B, the first differential ring gear 49A is drive linked by the idle gear 42 with the output element 23 of the differential gear mechanism P, and the second differential ring gear 49B is drive linked with the rotor shaft 51 of the electric motor M by a counter reduction gear mechanism.

Figure 15:
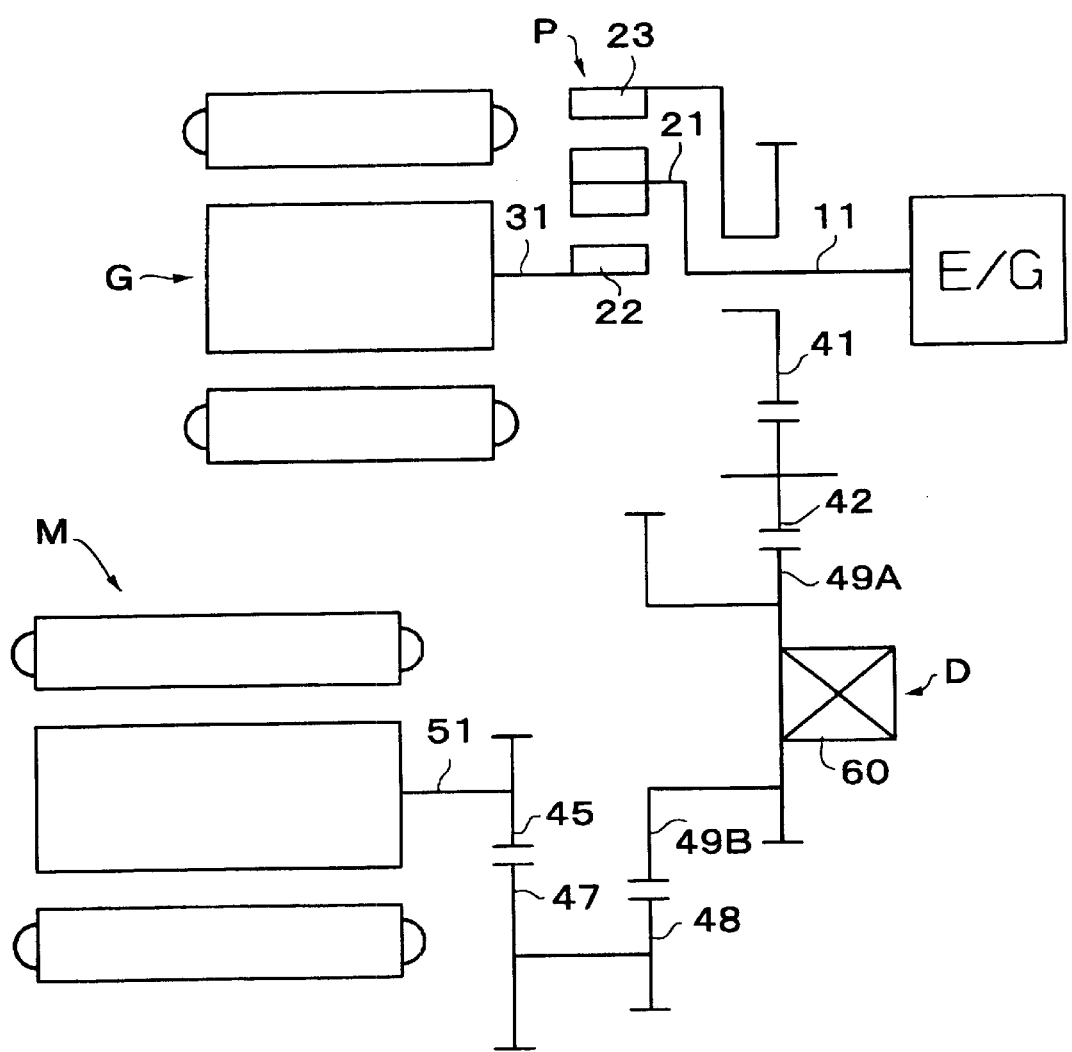
FIG. 15 is a schematic view of the hybrid drive apparatus according to the tenth exemplary embodiment of the invention.

In the tenth exemplary embodiment, the power train structure shown in FIG. 15 is similar to the train structure shown in the seventh exemplary embodiment in FIG. 12. The same alterations as described in the above two exemplary embodiments are implemented in the differential ring gear.

In each of the above exemplary embodiments, the engine side power transmission system and the electric motor side power transmission system were formed as separate systems in order to simplify the alteration of the gear ratio on the engine side and to simplify the implementation of measures against gear noise. However, if simplifying the alteration of the gear ratio is emphasized, it is possible to employ a structure in which one power transmission system is drive linked to the differential apparatus via the other power transmission system. As an example of the employing of this type of structure, a series of exemplary embodiments will now be described with respect to the structure employed for drive linking the electric motor side power transmission system to the differential apparatus via the engine side power transmission system.

Figure 16:
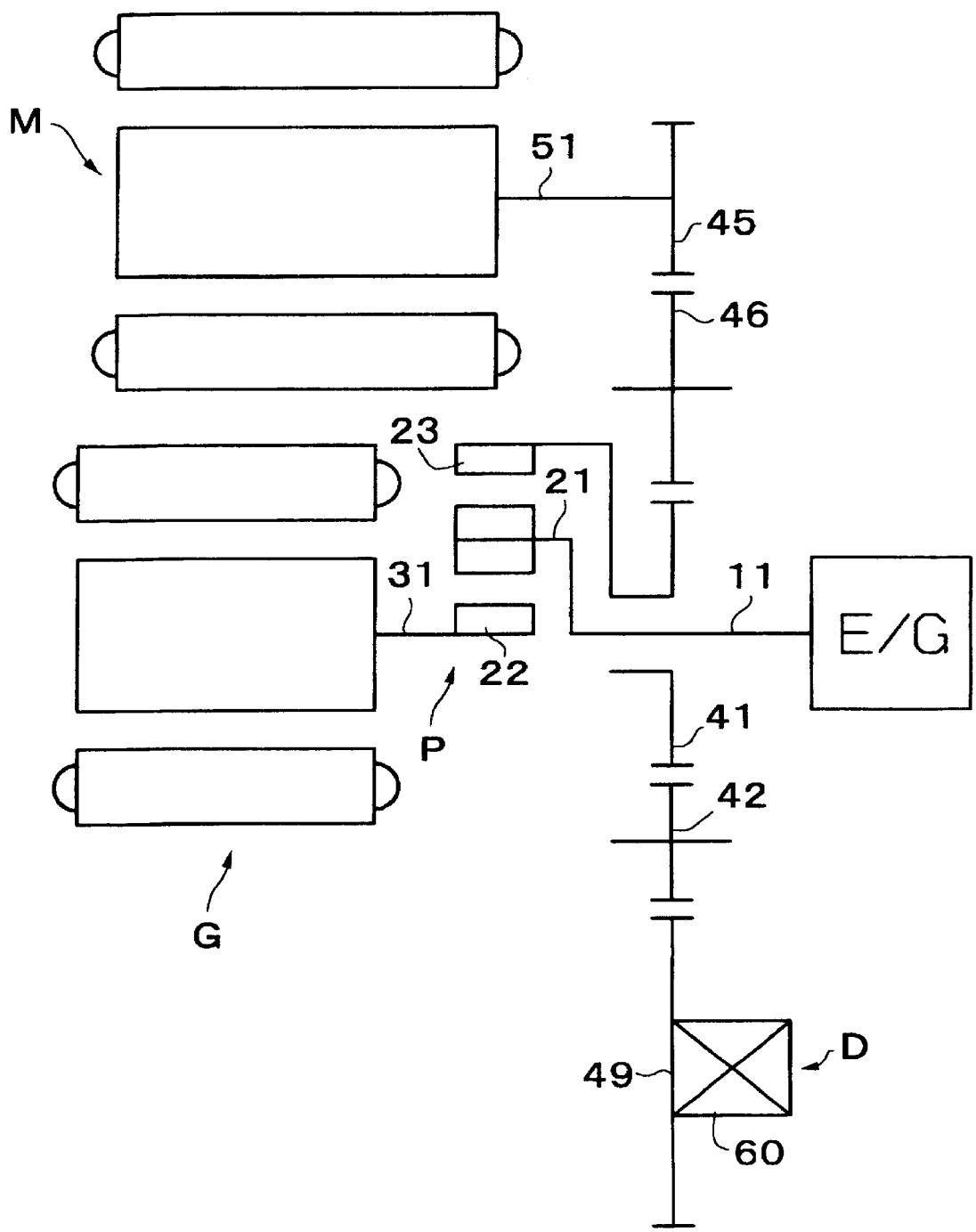
FIG. 16 is a schematic view of the hybrid drive apparatus according to the eleventh exemplary embodiment of the invention.

The hybrid drive apparatus of the eleventh exemplary embodiment shown in FIG. 16 is provided with an engine E/G, a generator G, a differential gear mechanism P that links the engine E/G and the generator G, an electric motor M, and a differential apparatus D, in the same way as in each of the above exemplary embodiments. The basic structure is formed by drive linking the output element of the differential gear mechanism P to the differential apparatus D via the engine side power transmission system, and drive linking the electric motor M to the differential apparatus D via the electric motor side power transmission system. Moreover, the drive apparatus is a transverse type drive apparatus for a front engine front drive (FF) vehicle or rear engine rear drive (RR) vehicle in which the engine E/G, the generator G, and the differential apparatus P are placed on a common axis, while the electric motor M and the output shaft of the differential apparatus D are placed on different axes respectively that are parallel with the above common axis.

The drive apparatus is identical in that it is composed of an electric motor side power transmission system that links the electric motor M with the differential apparatus D, and an engine side power transmission system that links the differential apparatus D with the output element of the differential gear mechanism P including a single pinion structure planetary gear set. However, the electric motor side power transmission system is linked to the differential apparatus via the engine side power transmission system. Specifically, the engine side power transmission system is formed from power transmission elements that drive link the output element 23 of the differential gear mechanism P with the differential ring gear 49 of the differential apparatus D, while the electric motor side power transmission system is formed from power transmission elements that drive link the rotor shaft 51 of the electric motor M with the output element 23 of the differential gear mechanism P.

In the engine side power transmission system in this form, the power transmission elements are formed from the counter drive gear 41 linked to a ring gear 23 as an output element of the differential gear mechanism P, and the idle gear 42 drive linked to the counter drive gear 41 and the differential ring gear 49. In the electric motor side power transmission system, the power transmission elements are formed from the electric motor output gear 45 fixed to the rotor shaft 51 of the electric motor M, and the idle gear 46 drive linked to the electric motor output gear 45 and the counter drive gear 41.

When this structure is employed, the gear ratios can be selected and altered on both the engine side and the electric motor side while merging the engine side power transmission system and the electric motor side power transmission system together by the power transmission elements between each of the axes of the engine and generator, the electric motor, and the differential apparatus. Accordingly there is no need to alter the position of the main axes as shown in FIG. 11. As a result, the casings before the alteration of the gear ratio setting and after the alteration of the gear ratio setting can be standardized. This point is the same for each of the series of exemplary embodiments that follow.

Figure 17:
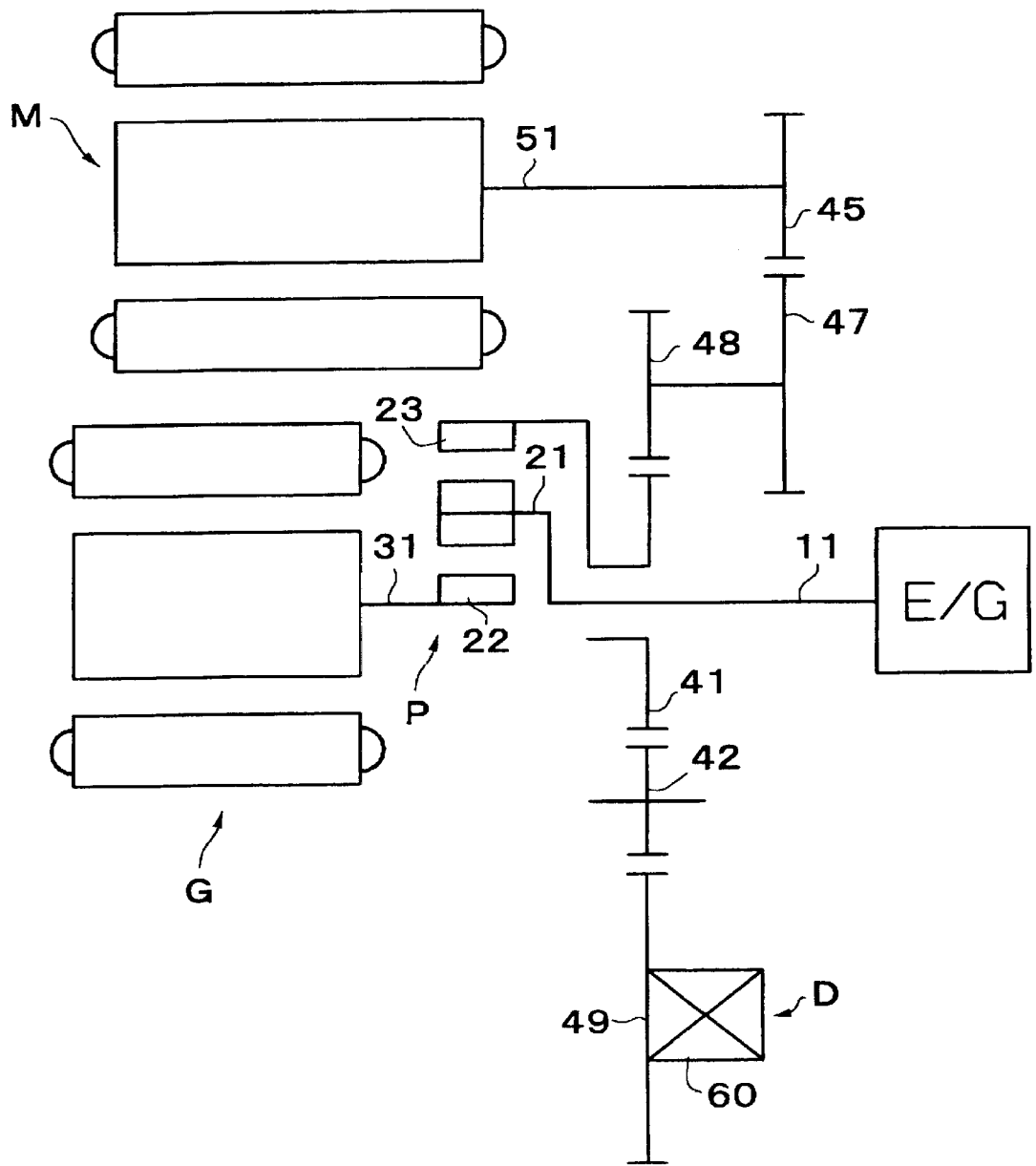
FIG. 17 is a schematic view of the hybrid drive apparatus according to the twelfth exemplary embodiment of the invention.

In the twelfth exemplary embodiment shown in FIG. 17, a counter reduction gear mechanism is used instead of the idle gear 46 of the electric motor side power transmission system of the eleventh exemplary embodiment.

Figure 18:
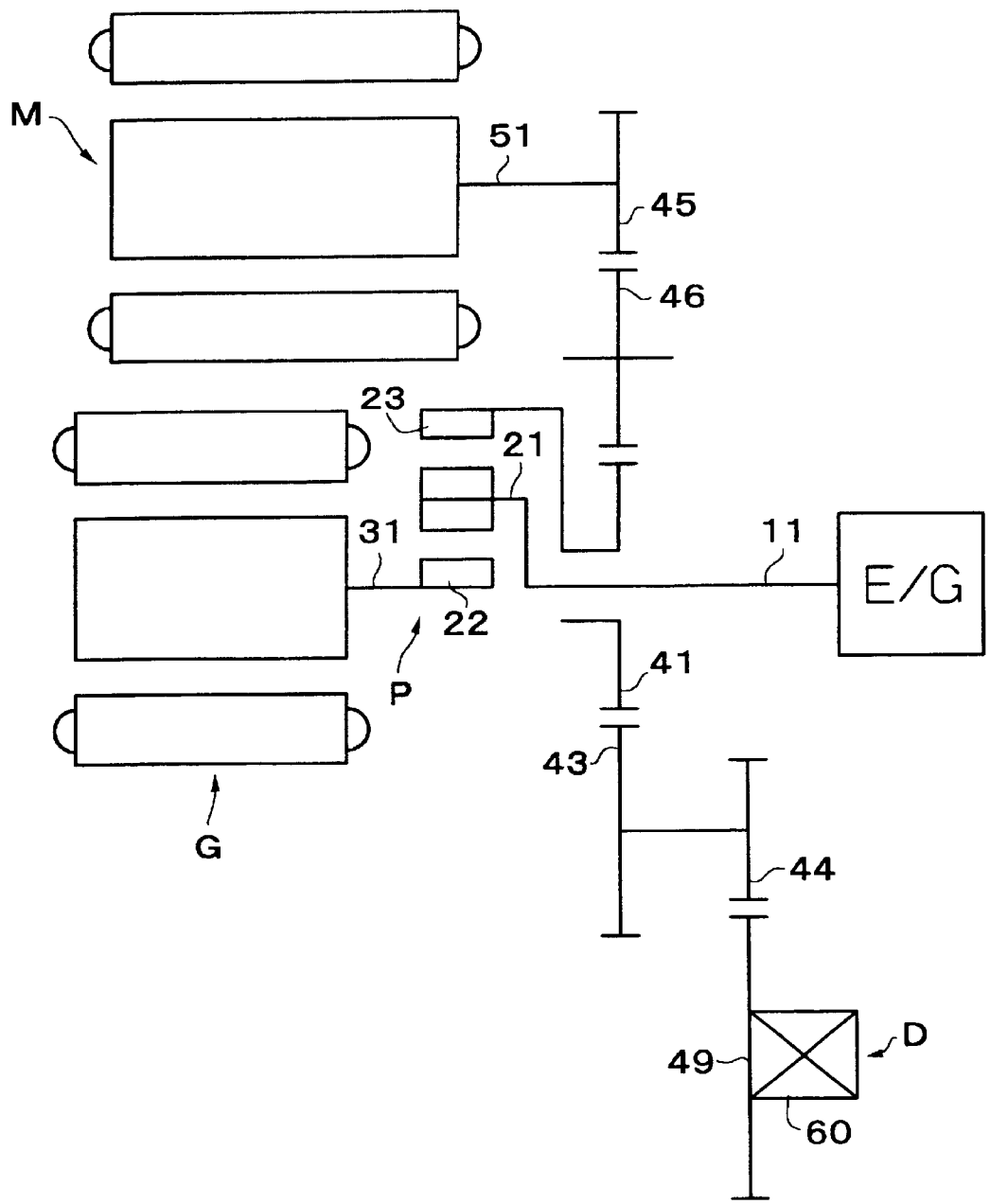
FIG. 18 is a schematic view of the hybrid drive apparatus according to the thirteenth exemplary embodiment of the invention.

In the thirteenth exemplary embodiment shown in FIG. 18, a counter reduction gear mechanism is used instead of the idle gear 42 of the engine side power transmission system of the eleventh exemplary embodiment.

Figure 19:
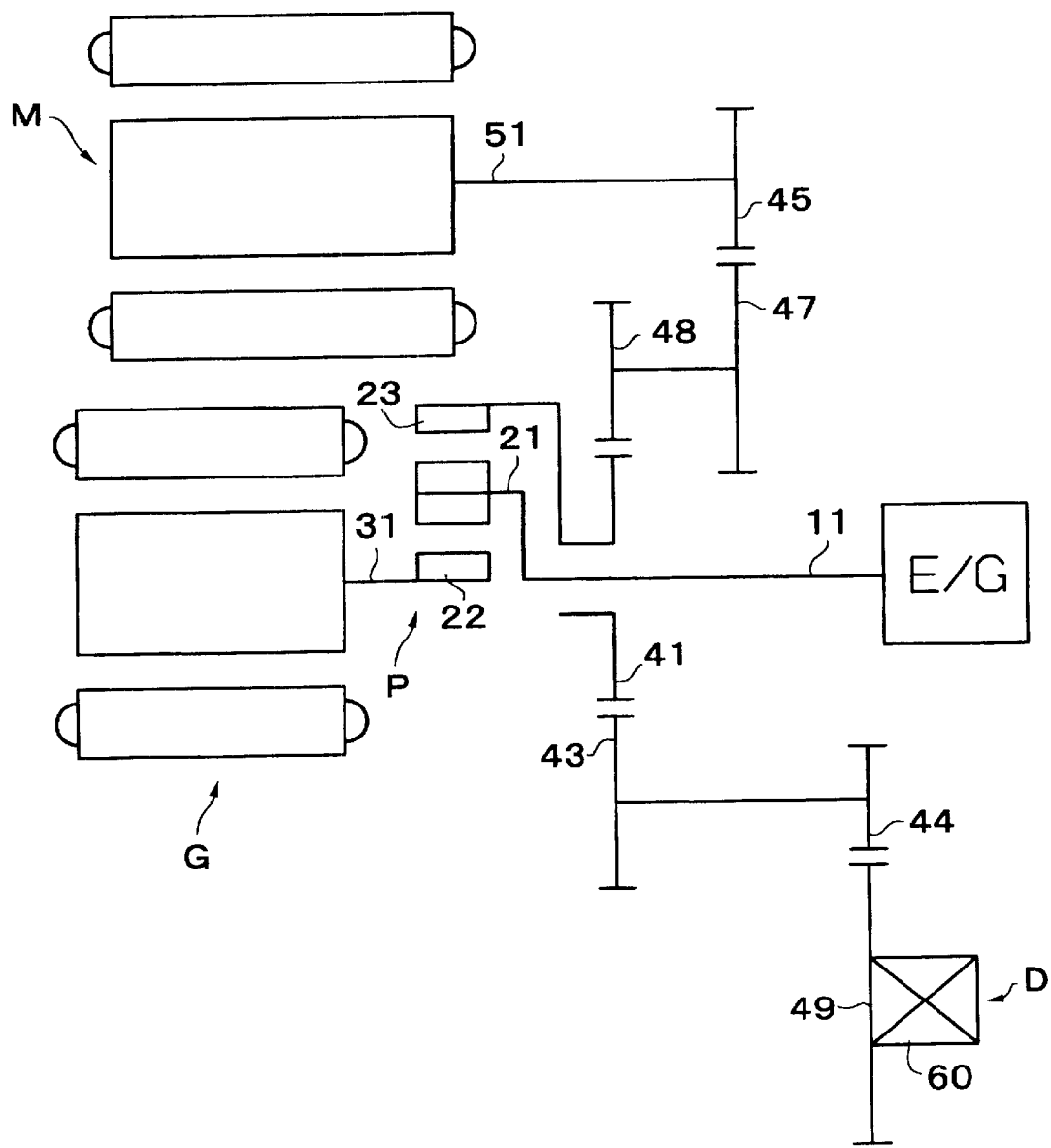
FIG. 19 is a schematic view of the hybrid drive apparatus according to the fourteenth exemplary embodiment of the invention.

In the fourteenth exemplary embodiment shown in FIG. 19, the counter reduction gear mechanisms are used instead of the idle gears of both the engine side power transmission system and the electric motor side power transmission system.

Figure 20:
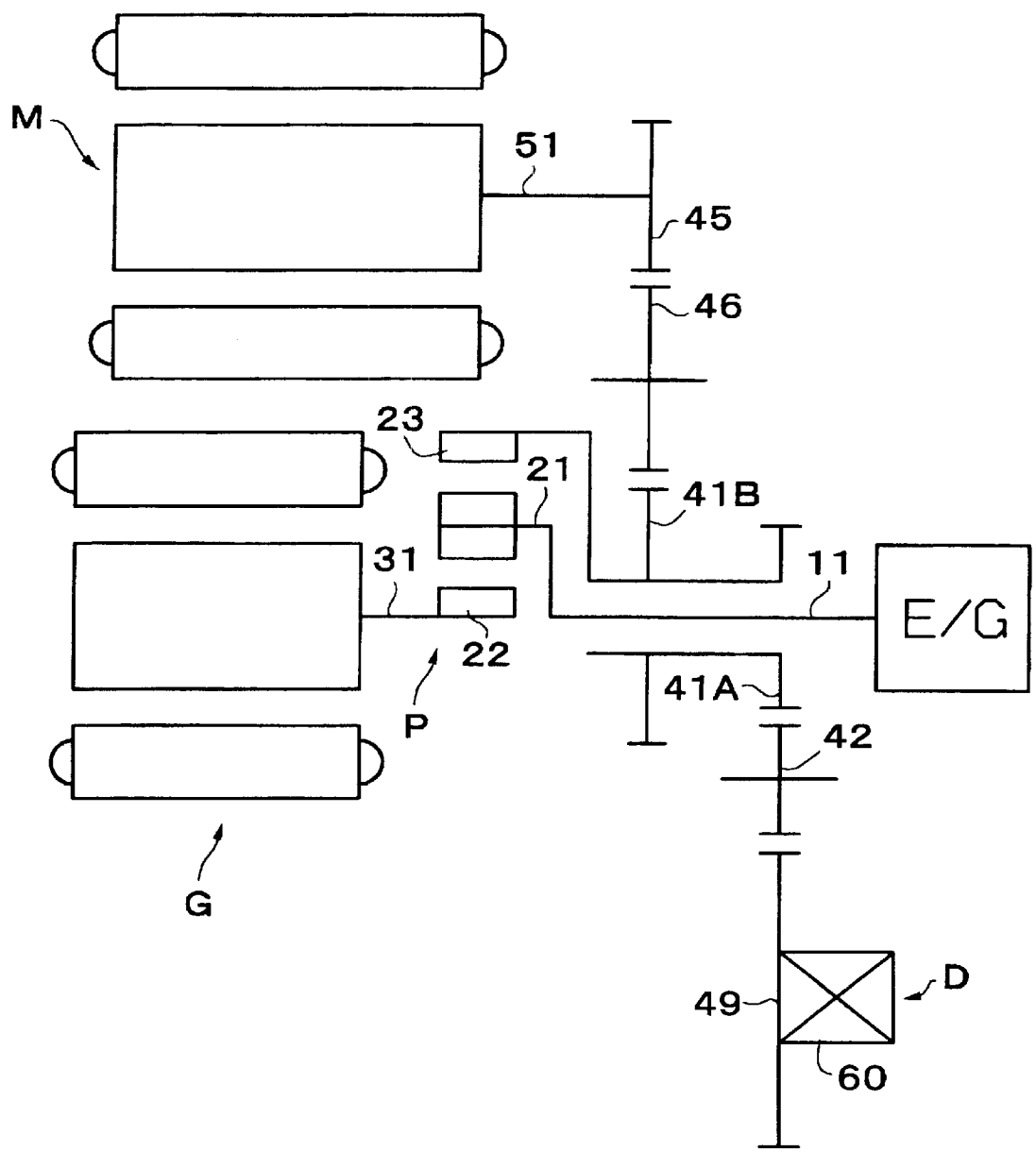
FIG. 20 is a schematic view of the hybrid drive apparatus according to the fifteenth exemplary embodiment of the invention.

Next, FIG. 20 shows the fifteenth exemplary embodiment with a split structure for the counter ring gear 41. In this exemplary embodiment, the engine side power transmission system is formed from a first counter drive gear 41A linked with the output element 23 of the differential gear mechanism P, and a power transmission element, namely, the idle gear 42 drive linking the counter drive gear 41A with the differential ring gear 49. The electric motor side power transmission system is formed from an electric motor output gear 45 fixed to the rotor shaft 51 of the electric motor M, and a power transmission element, namely, the idle gear 46 that drives and links the electric motor output gear 45 and a second counter drive gear 41B. The second counter drive gear 41B is thus linked with the output element 23 of the differential gear mechanism P.

Figure 21:
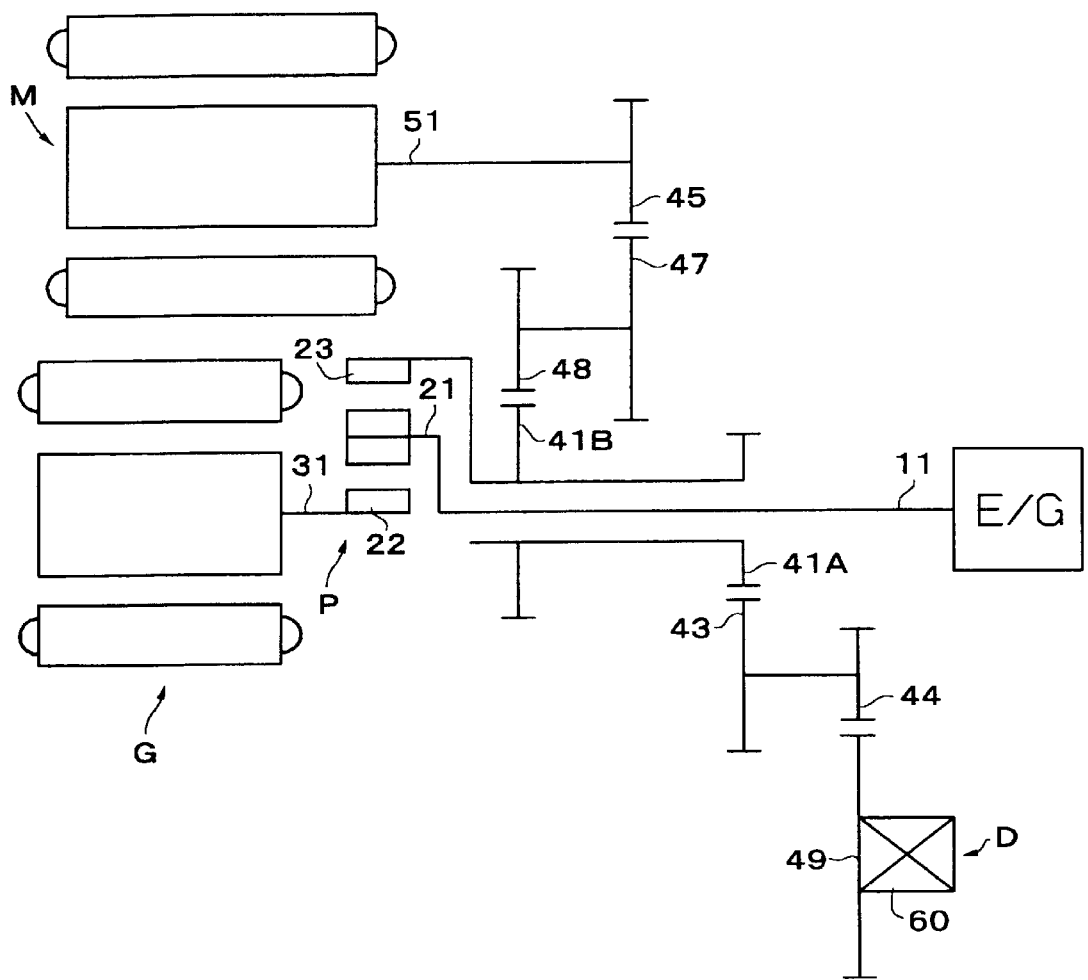
FIG. 21 is a schematic view of the hybrid drive apparatus according to the sixteenth exemplary embodiment of the invention.

In the sixteenth exemplary embodiment shown in FIG. 21, both the idle gear of the engine side power transmission system and the idle gear of the electric motor side power transmission system in the fifteenth exemplary embodiment are replaced by a counter reduction gear mechanism.

Figure 22:
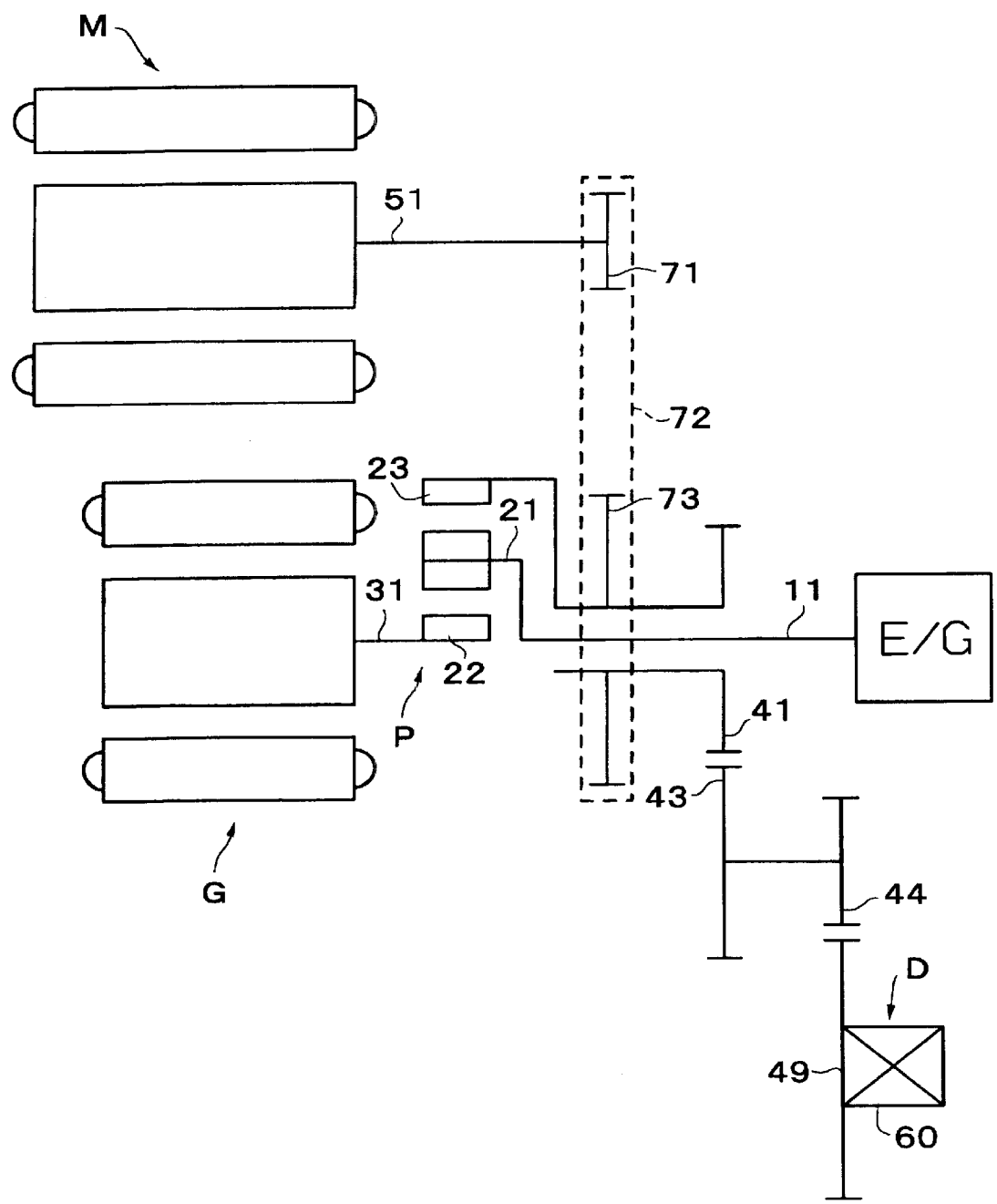
FIG. 22 is a schematic view of the hybrid drive apparatus according to the seventeenth exemplary embodiment of the invention.

In the seventeenth exemplary embodiment shown in FIG. 22, the electric motor side power transmission system is formed from a chain transmission mechanism serving as a unidirectional rotation transmission mechanism. The power transmission elements in this case are composed of a sprocket 71 fixed to the rotor shaft 51 of the electric motor M, a sprocket 73 linked with the output element 23 of the differential gear mechanism P, and a chain 72 entrained between the sprockets.

Figure 23:
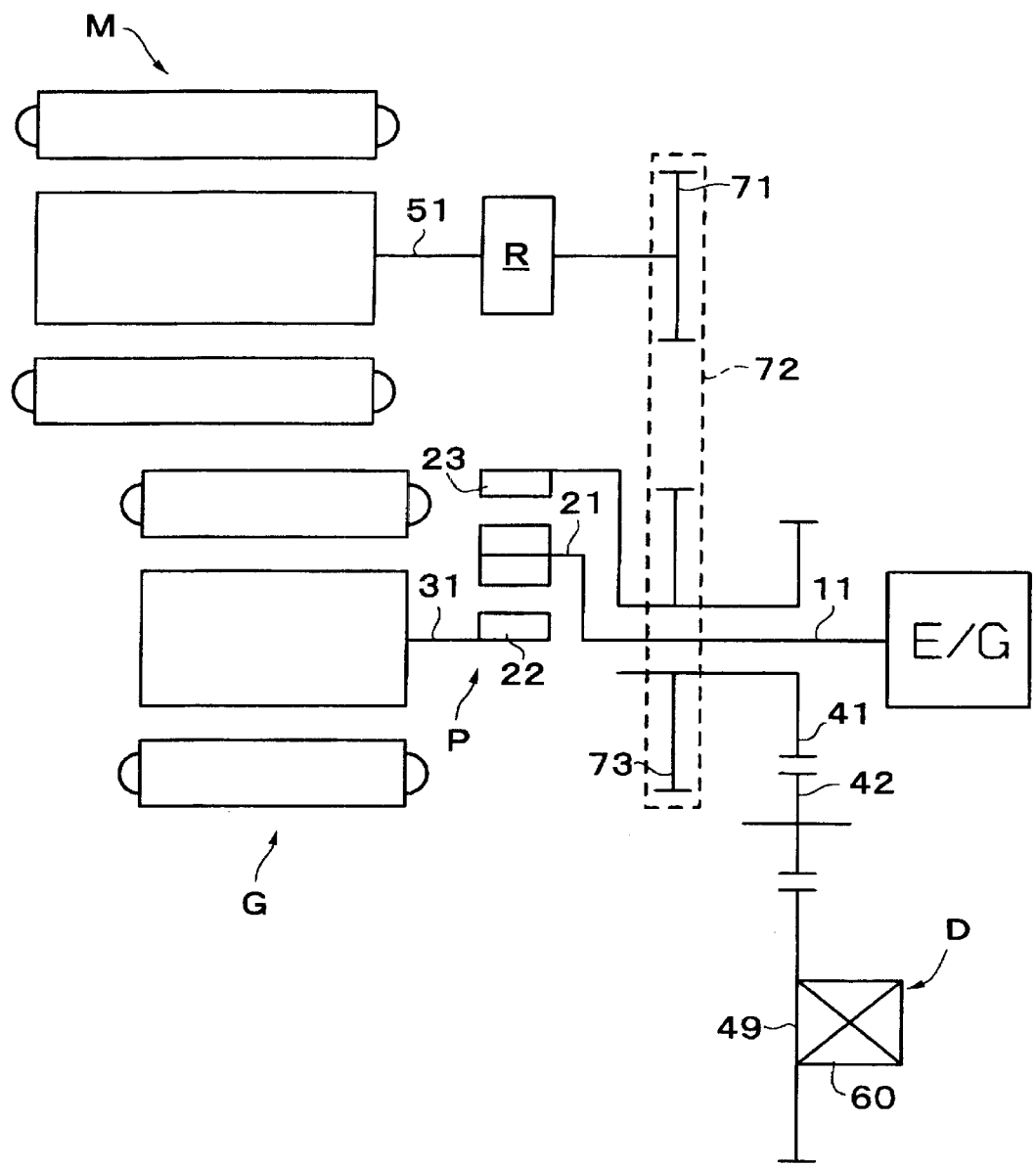
FIG. 23 is a schematic view of the hybrid drive apparatus according to the eighteenth exemplary embodiment of the invention.

The eighteenth exemplary embodiment shown in FIG. 23 is similar to the seventeenth exemplary embodiment, with coaxial reduction apparatus R inserted in the electric motor side power transmission system and with the counter reduction gear mechanism of the engine side power transmission system replaced with the idle gear 42.

Next, as another example of a structure in which one power transmission system is drive linked to the differential apparatus via the other power transmission system, a description will be given of a series of exemplary embodiments that employ a structure where the engine side power transmission system is drive linked to the differential apparatus via the electric motor power transmission system.

Figure 24:
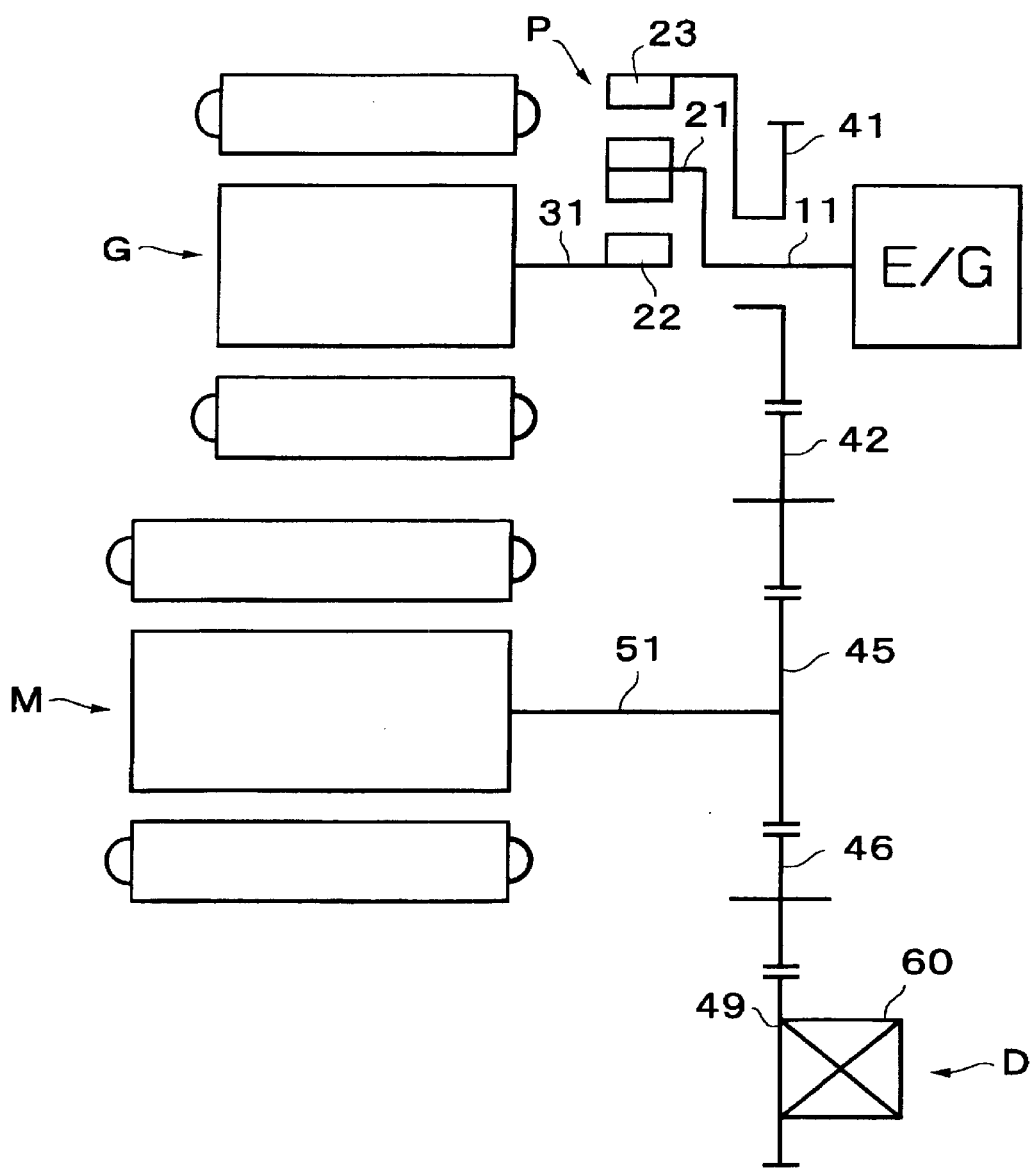
FIG. 24 is a schematic view of the hybrid drive apparatus according to the nineteenth exemplary embodiment of the invention.
Figure 25:
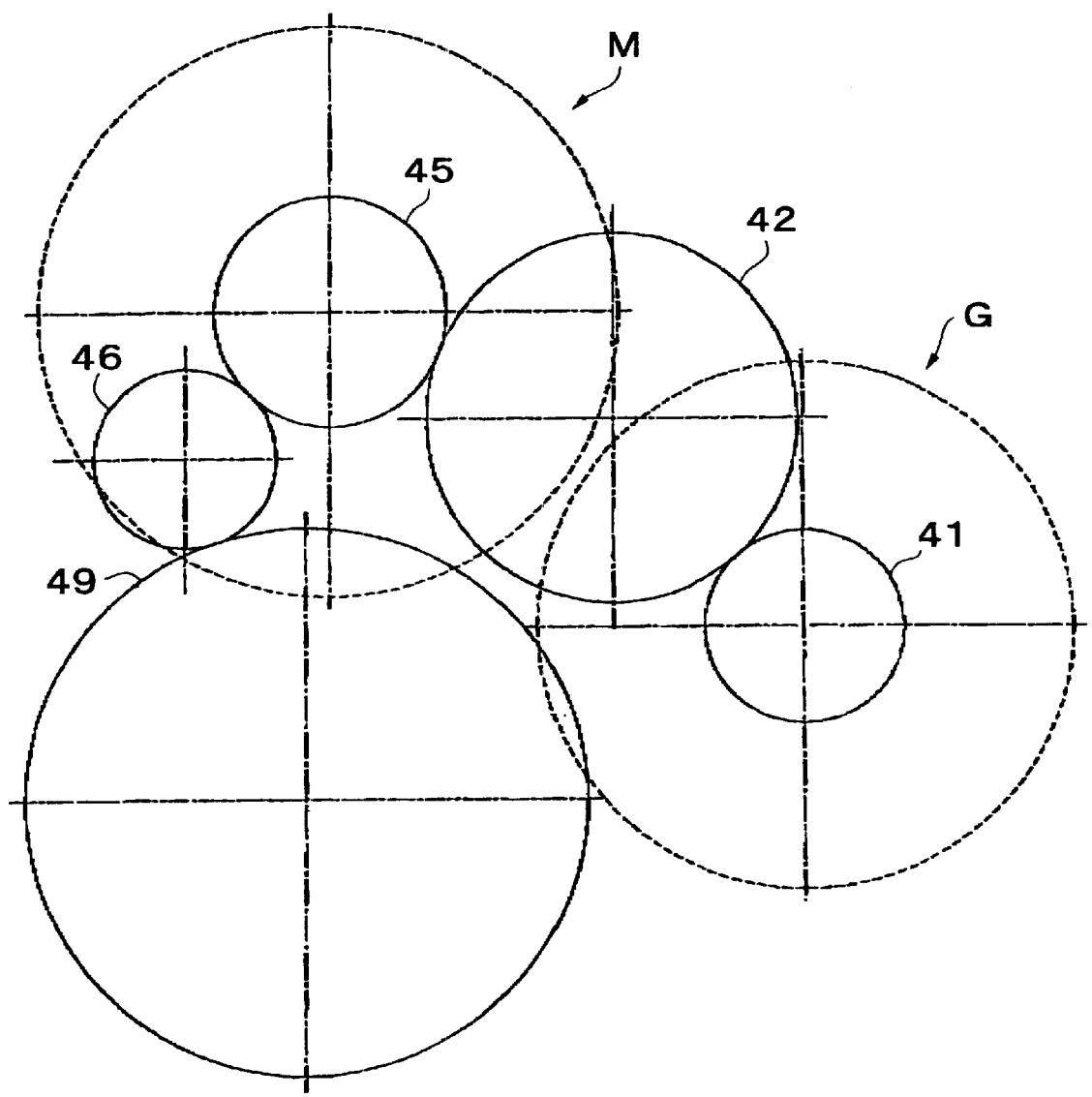
FIG. 25 is an arrangement diagram showing the meshing relationships between each gear of the power transmission systems of the nineteenth exemplary embodiment.

Firstly, FIGS. 24 and 25 show the axes of a power train of the hybrid drive apparatus of the nineteenth exemplary embodiment and a view of the gear meshing in the drive apparatus as seen from the axial direction. The basic structure of this apparatus is the same as that of each of the above exemplary embodiments with this exemplary embodiment provided with an engine E/G, a generator G, a differential gear mechanism P linking the engine E/G and the generator G, an electric motor M, and a differential apparatus D. Moreover, in this drive apparatus, the engine side power transmission system, in which the output element of a differential gear mechanism P including a single pinion structure planetary gear set is drive linked to the differential apparatus D, is linked to the differential apparatus D via the electric motor power transmission system linking the electric motor M with the differential apparatus D.

The power transmission elements of the electric motor side power transmission system in the present exemplary embodiment are composed of the electric motor output gear 45 fixed to the rotor shaft 51, the idle gear 46 that meshes with the electric motor output gear 45 and the differential ring gear 49. The power transmission elements of the engine side power transmission system are composed of the counter drive gear 41 linked with the ring gear 23 of the differential gear mechanism P and the idle gear 42 that meshes with the counter drive gear 41 and the motor output gear 45.

When this type of structure is employed, as is shown by the actual relationship between the axial positions and the gear meshing shown in FIG. 25, the total gear ratio on the engine side is determined by the gear ratio between the electric motor output gear 45 and the counter drive gear 41 having a predetermined gear ratio, and the gear ratio between the electric motor output gear 45 and the differential ring gear 49, namely, the electric motor side gear ratio. However, when altering the total gear ratio on the engine side only, the diameter of the counter drive gear 41 is altered, and by dealing with the resulting change in the gap between the electric motor output gear 45 and the counter drive gear 41, which changes as a result of the above altering of the diameter, by shifting the axial position of the idle gear 42 relative to the electric motor output gear 45 and the counter drive gear 41 as shown in FIG. 25. Moreover, altering the gear ratio on the electric motor side as well can be accomplished by altering the diameter of the electric motor output gear 45 and dealing with the resulting change in the gap between the electric motor output gear 45 and the differential ring gear 49 by shifting the position of idle gear 46 relative to the electric motor output gear 45 and differential ring gear 49 as shown in FIG. 25. The resulting change in the gap between the electric motor output gear 45 and the counter drive gear 41 can be dealt with by shifting the axial positions of the idle gear 42 relative to the electric motor output gear 45 and the counter drive gear 41 as shown in FIG. 25. If the diameter of any one of the counter drive gear 41, the electric motor output gear 45, and the differential ring gear 49 is to be altered in this way, as well as if the diameters of any combination of these is to be altered, this can be dealt with by shifting the axial positions of both of the idle gears 42, 46.

Thus, according to the drive apparatus, it is possible to alter the total gear ratio on the engine side and, if necessary, to also alter the gear ratio on the electric motor side with the positions of the three main axes, where the engine E/G, the electric motor M, and the differential apparatus D are placed and fixed. Accordingly demands for the alteration of each gear ratio can be met without significantly altering the drive apparatus casing. Further, particularly when idle gears are used in both power transmission systems, because it is possible to place all the power transmission elements together within the same plane, the advantage of the more compact size of the drive apparatus can be obtained.

Figure 26:
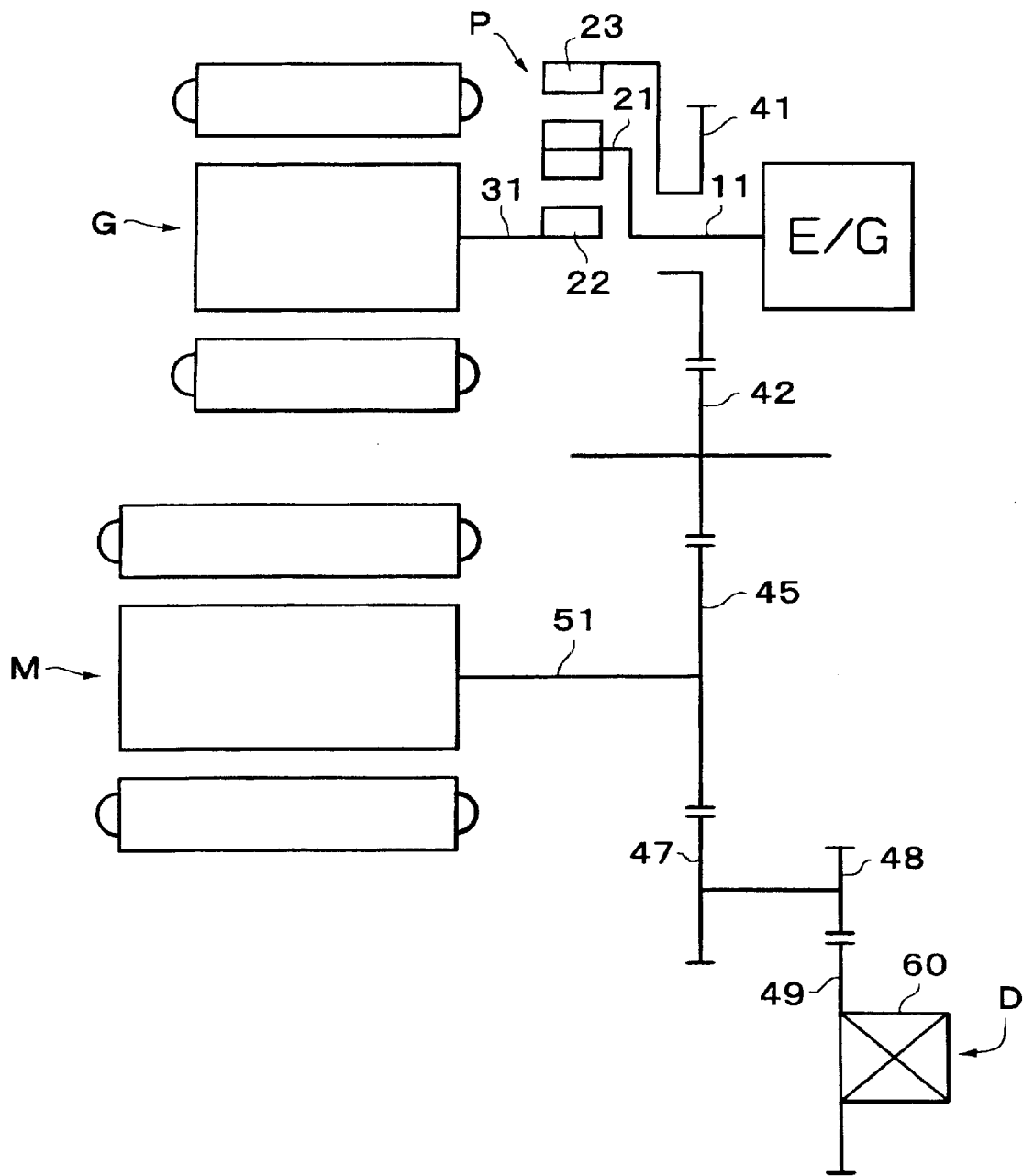
FIG. 26 is a schematic view of the hybrid drive apparatus according to the twentieth exemplary embodiment of the invention.
Figure 27:
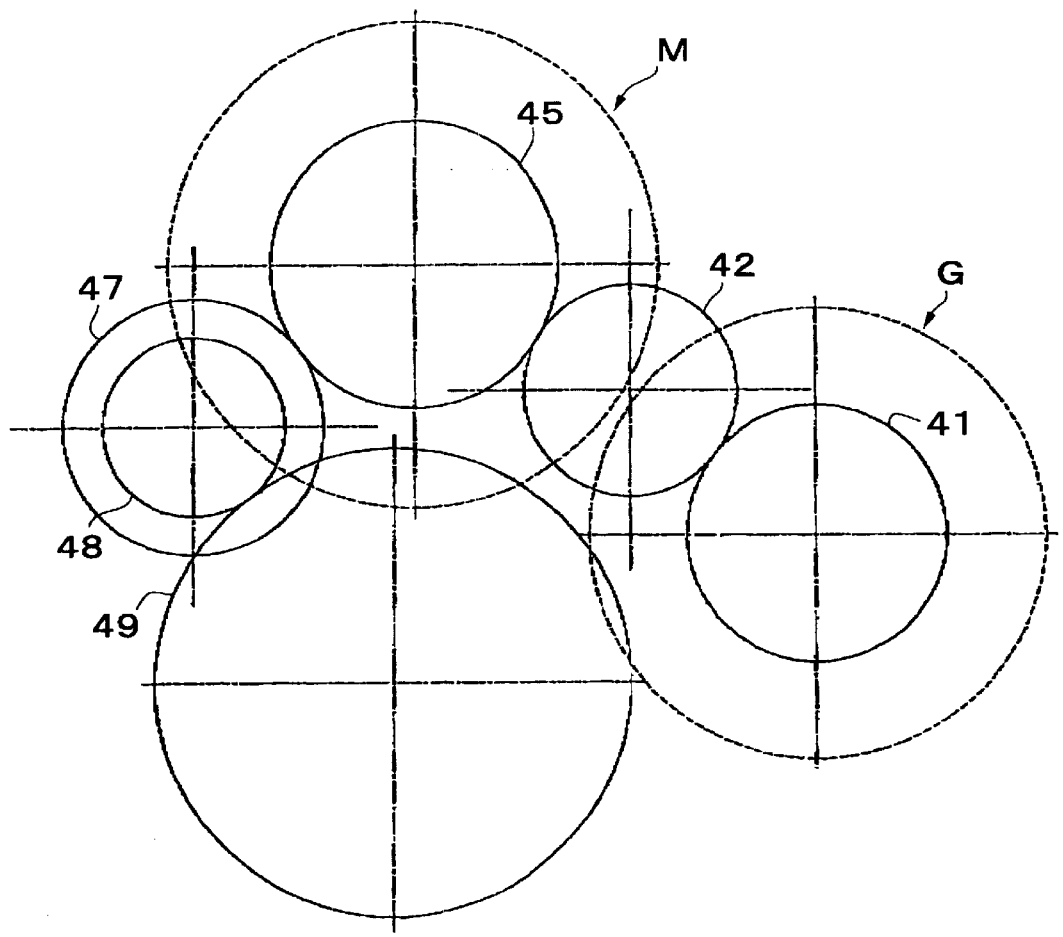
FIG. 27 is an arrangement diagram showing the meshing relationships between each gear of the power transmission systems of the twentieth exemplary embodiment.

Next, FIGS. 26 and 27 show the twentieth exemplary embodiment. In this exemplary embodiment, the power transmission elements of the engine side power transmission system are the same as those of the nineteenth exemplary embodiment with only the power transmission element of the electric motor side power transmission system altered to a counter gear mechanism having a reduction function. The counter reduction gear mechanism in this form is composed of the electric motor output gear 45 fixed to the rotor shaft 51 of the electric motor M. The counter driven gear 47 meshes with the electric motor output gear 45. The pinion gear 48 is linked with the counter driven gear 47 and meshes with the differential ring gear 49.

In the case where this form is employed, referring now to the relationship between the actual axial positions and the power transmission elements shown in FIG. 27, it is possible to alter the total gear ratio on the engine side by altering the gear ratio of the electric motor side power transmission system. The elements altered in this case are the diametric ratio of the counter driven gear 47 to the electric motor output gear 45, or the diametric ratio of the differential ring gear 49 to the pinion gear 48. It is necessary to shift the axial position of the idle gear 42 only when altering the diameter of the electric motor output gear 25.

Figure 28:
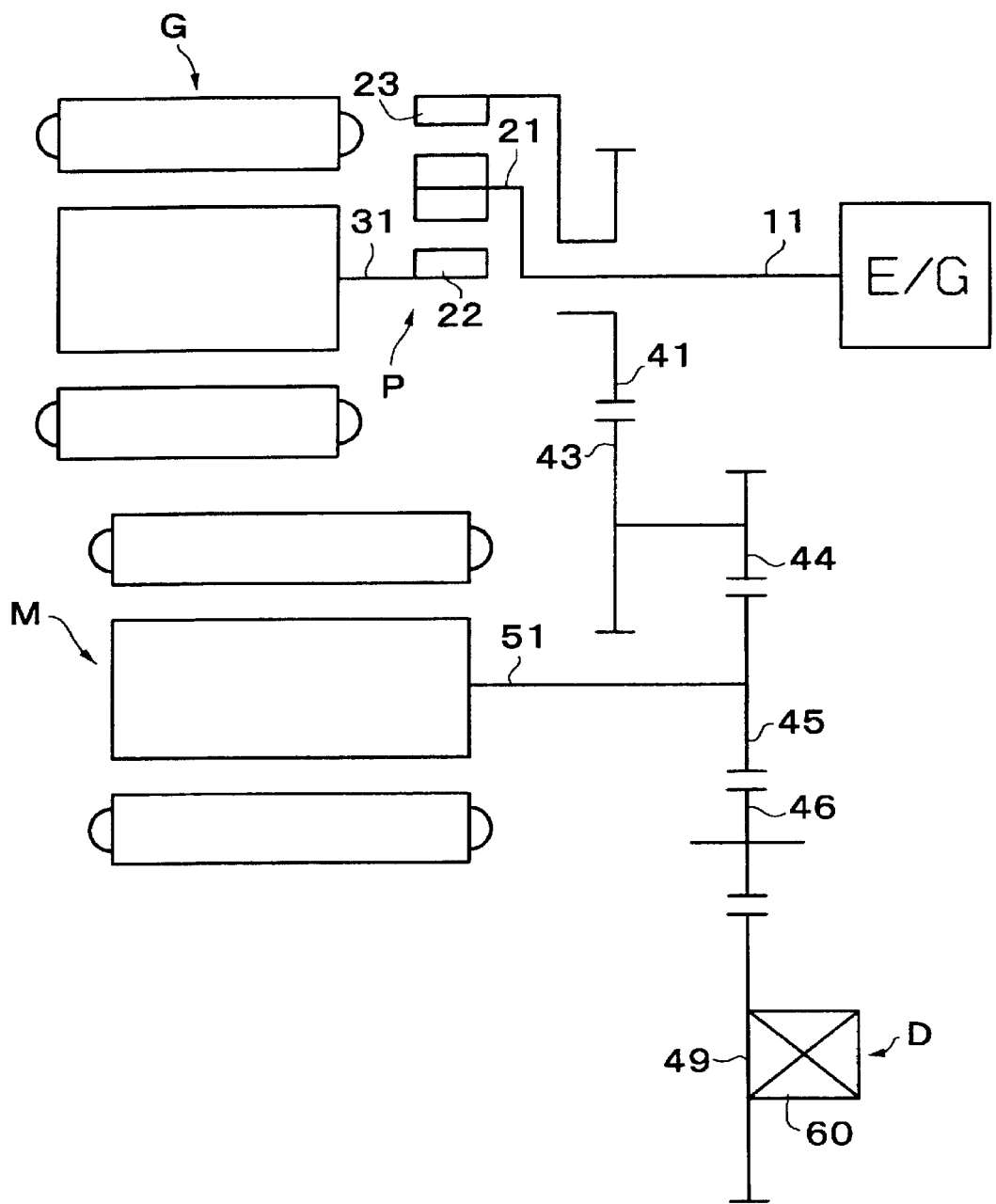
FIG. 28 is a schematic view of the hybrid drive apparatus according to the twenty-first exemplary embodiment of the invention.

The twenty-first exemplary embodiment shown in FIG. 28 is opposite to the twentieth exemplary embodiment. The power transmission elements of the engine side power transmission system are altered to a counter reduction gear mechanism.

Figure 29:
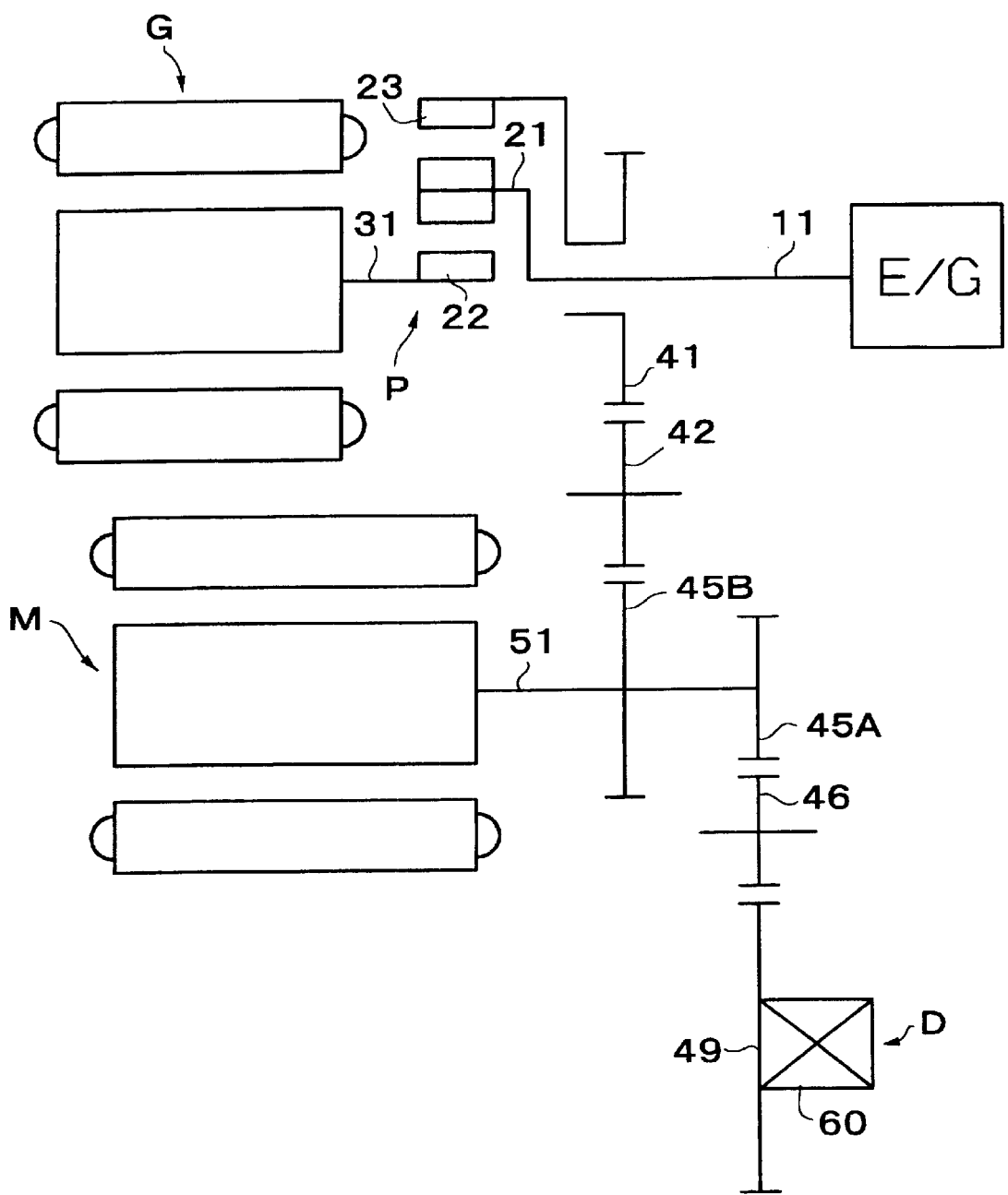
FIG. 29 is a schematic view of the hybrid drive apparatus according to the twenty-second exemplary embodiment of the invention.

FIG. 29 shows the twenty-second exemplary embodiment in which the electric motor output gear is formed with a split structure as similar to the fifteenth exemplary embodiment shown in FIGS. 20 and 21. In this form, using the previous nineteenth exemplary embodiment as the basic structure, the idle gear 42 of the engine side power transmission system meshes with one electric motor output gear 45B, fixed to the rotor shaft 51 of the electric motor M, while the other electric motor output gear 45B, meshes with the differential ring gear 49 via the idle gear 46.

In the case where this form is employed, it becomes possible to separately alter the meshing diameters of the electric motor output gears relative to the counter drive gear 41 and the differential ring gear 49. Thus, altering the gear ratios of both the engine side power transmission system and the electric motor side power transmission system is simplified.

Figure 30:
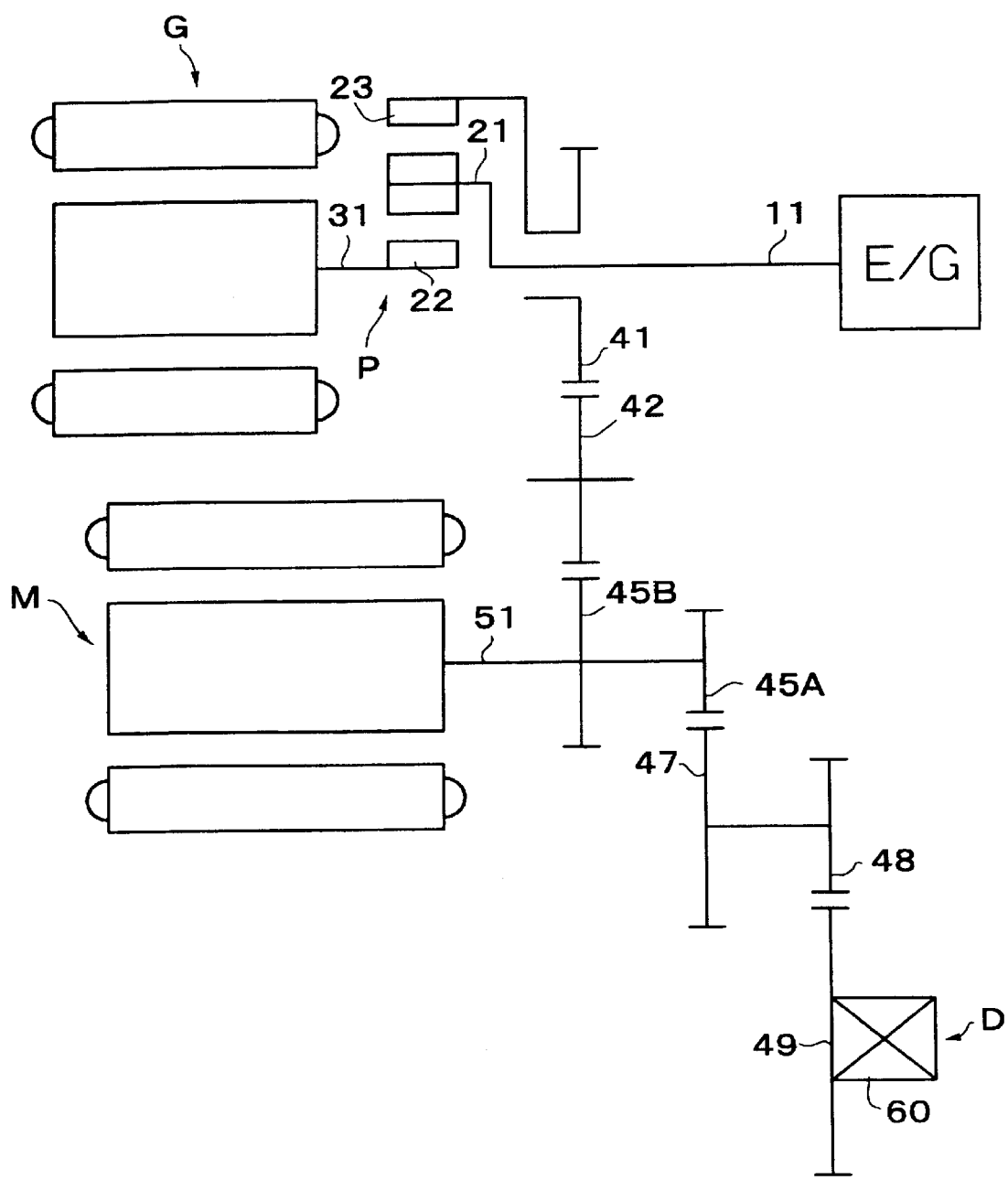
FIG. 30 is a schematic view of the hybrid drive apparatus according to the twenty-third exemplary embodiment of the invention.

In the twenty-third exemplary embodiment shown in FIG. 30, the idle gear of the electric motor side power transmission system of the twenty-second exemplary embodiment is changed to a counter reduction gear mechanism.

Figure 31:
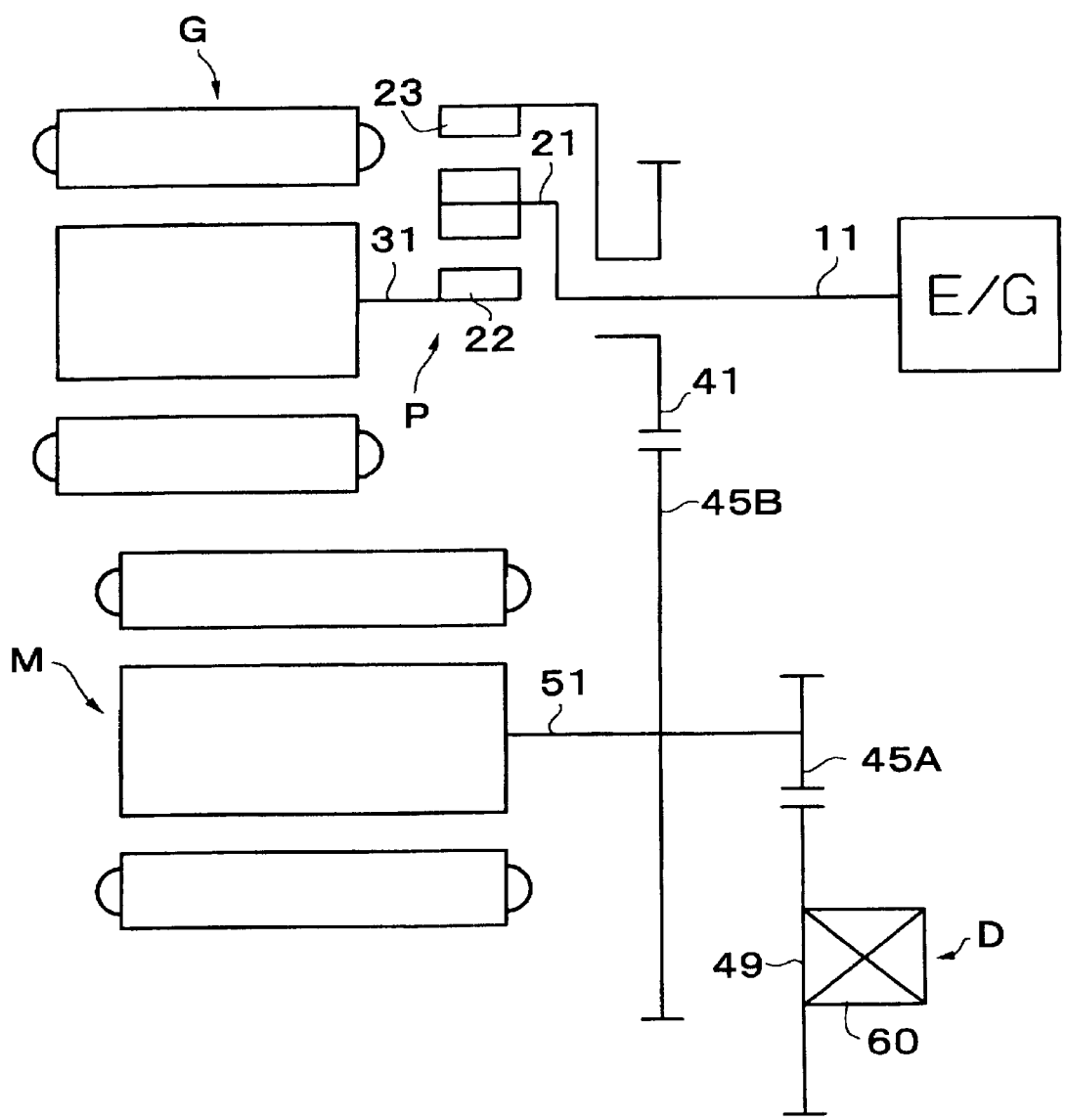
FIG. 31 is a schematic view of the hybrid drive apparatus according to the twenty-fourth exemplary embodiment of the invention.

FIG. 31 shows the twenty-fourth exemplary embodiment which is the twenty-second exemplary embodiment reduced to its simplest form. In this form, a structure is employed in which the engine side power transmission system and the electric motor side power transmission system are directly drive linked without interposing any intermediate transmission elements between the two. Namely, the counter drive gear 41 that forms the engine side power transmission system meshes with the electric motor output gear 45B, fixed to the rotor shaft 51 of the electric motor M, while the electric motor output gear 45A, that forms the electric motor side power transmission system, meshes with the differential ring gear 49.

When this form is employed, it is possible to alter the total gear ratio on the engine side by altering the meshing diametric ratio of the counter drive gear and the electric motor output gear without affecting the gear ratio on the electric motor side.

Figure 32:
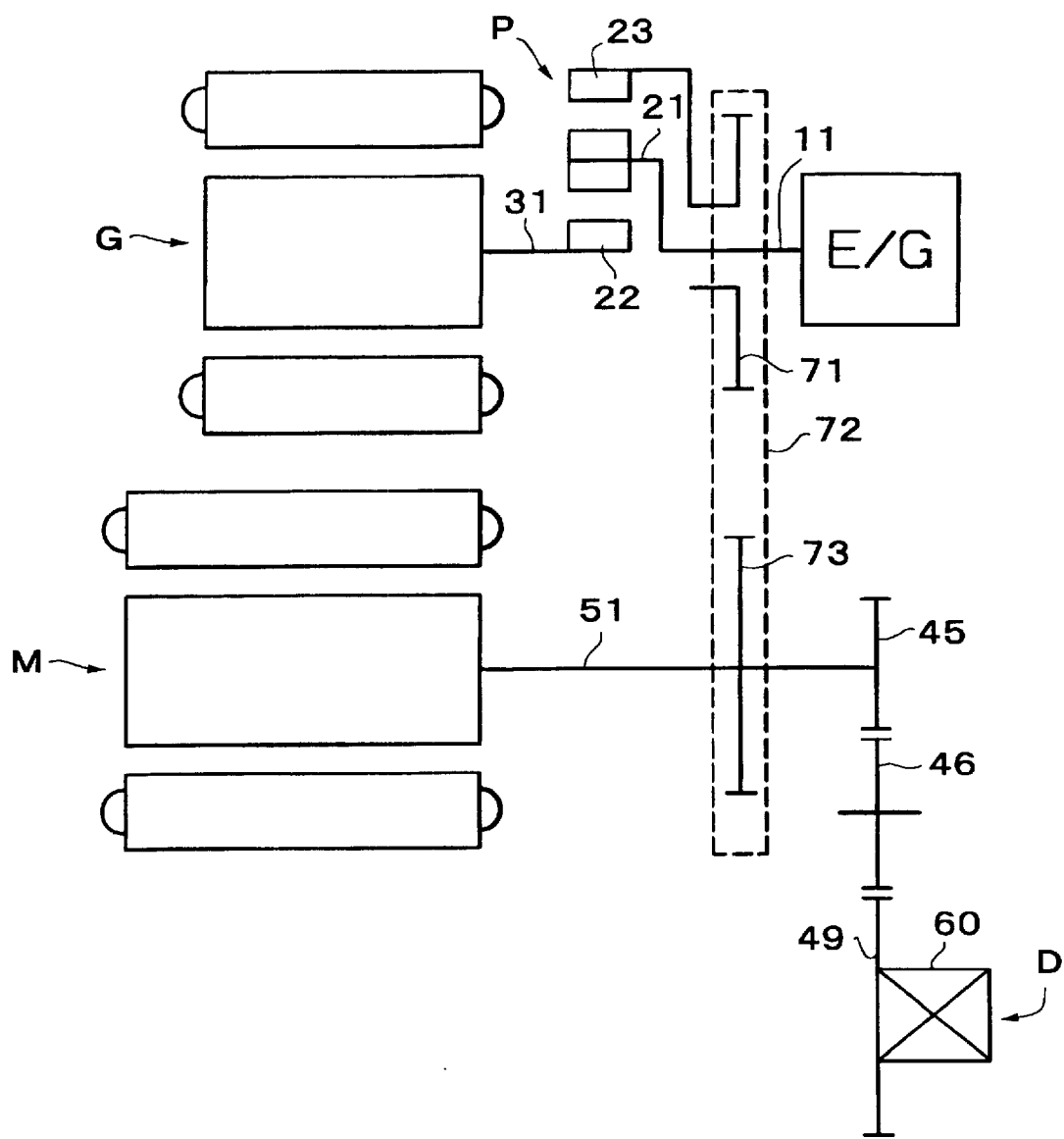
FIG. 32 is a schematic view of the hybrid drive apparatus according to the twenty-fifth exemplary embodiment of the invention.
Figure 33:
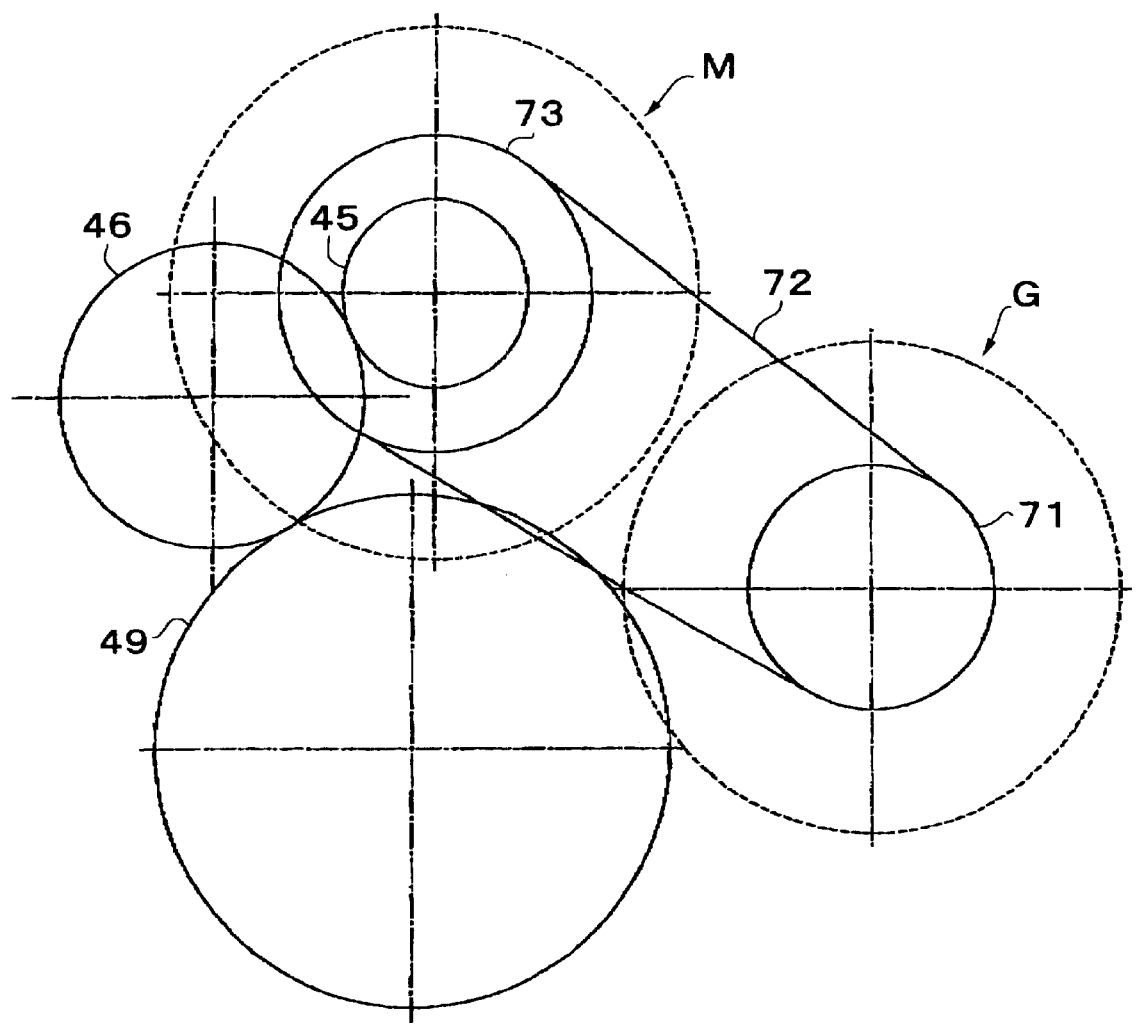
FIG. 33 is an arrangement diagram showing the meshing relationships between each gear of the power transmission systems of the twenty-fifth exemplary embodiment.

FIGS. 32 and 33 show the twenty-fifth exemplary embodiment in which the transmission mechanism of the engine side power transmission system in the twenty-second exemplary embodiment is changed to a chain transmission mechanism. Specifically, the chain transmission mechanism includes a sprocket 71 linked with the ring gear 23 of the differential gear mechanism P, a sprocket 73 fixed to the rotor shaft 51 of the electric motor M, and a chain 72 entrained between the sprockets 71, 73.

In the case where this form is employed, referring now to the relationship between the actual axial positions and the transmission mechanism shown in FIG. 33, the total gear ratio on the engine side is decided by the gear ratio determined by the diametric difference between the two sprockets 71, 73 that have a predetermined reduction ratio, and the gear ratio of the electric motor output gear 45 and the differential ring gear 49, namely, the gear ratio on the electric motor side. In this form, altering the total gear ratio on the engine side can be dealt with by simply altering the diametric difference between the sprockets 71, 73 without the axial positions being shifted. Moreover, when altering the gear ratio on the electric motor side as well, the description given for the nineteenth exemplary embodiment applies. Thus, in this exemplary embodiment as well, it is possible to deal with the demands for the alteration of each reduction ratio in the same way as in the nineteenth exemplary embodiment without needing to perform any major alteration in the drive apparatus casing. In particular, when altering the total gear ratio of an engine whose practical requirements are high, an unchanged standardized gearbox casing can be used.

Figure 34:
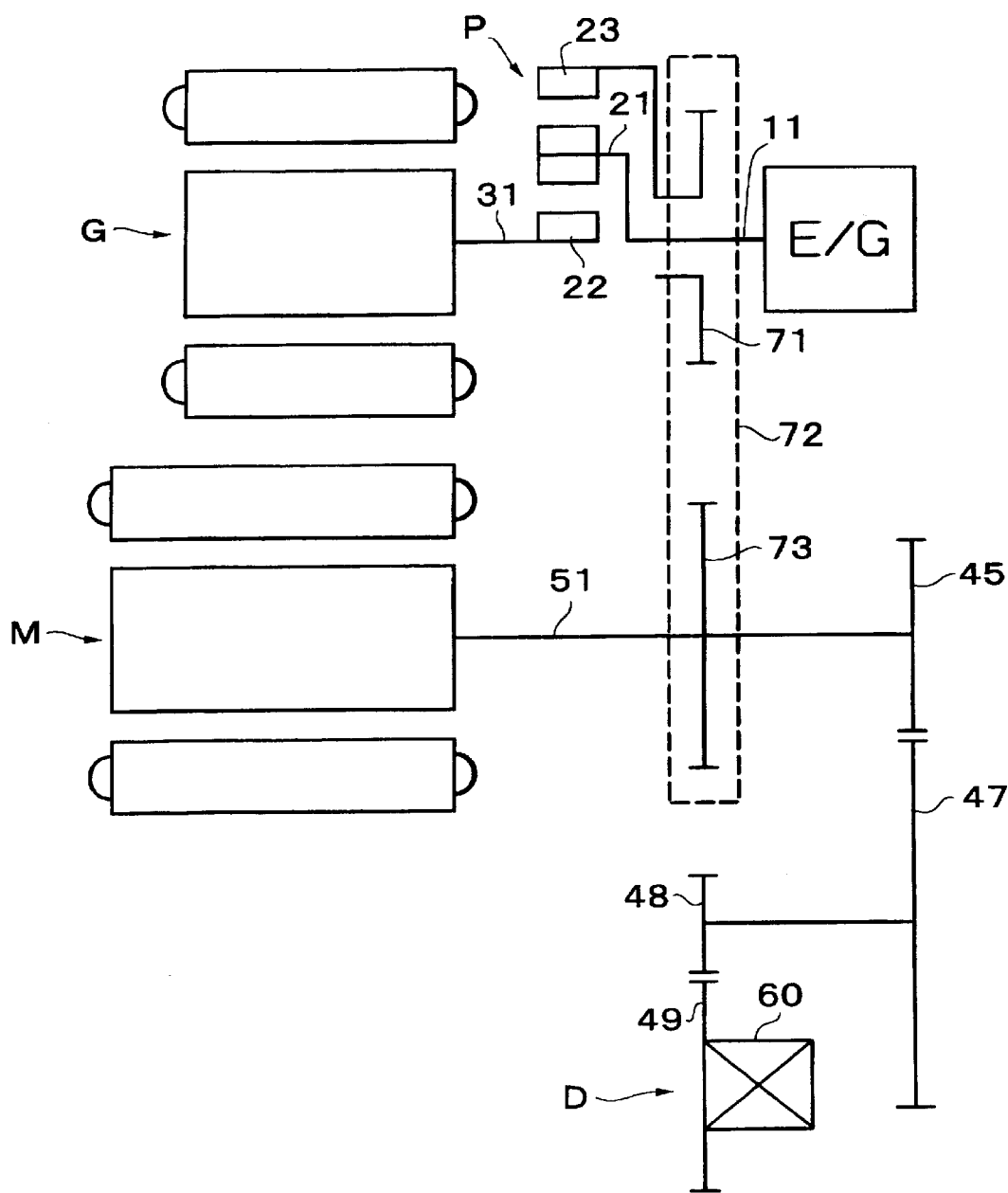
FIG. 34 is a schematic view of the hybrid drive apparatus according to the twenty-sixth exemplary embodiment of the invention.
Figure 35:
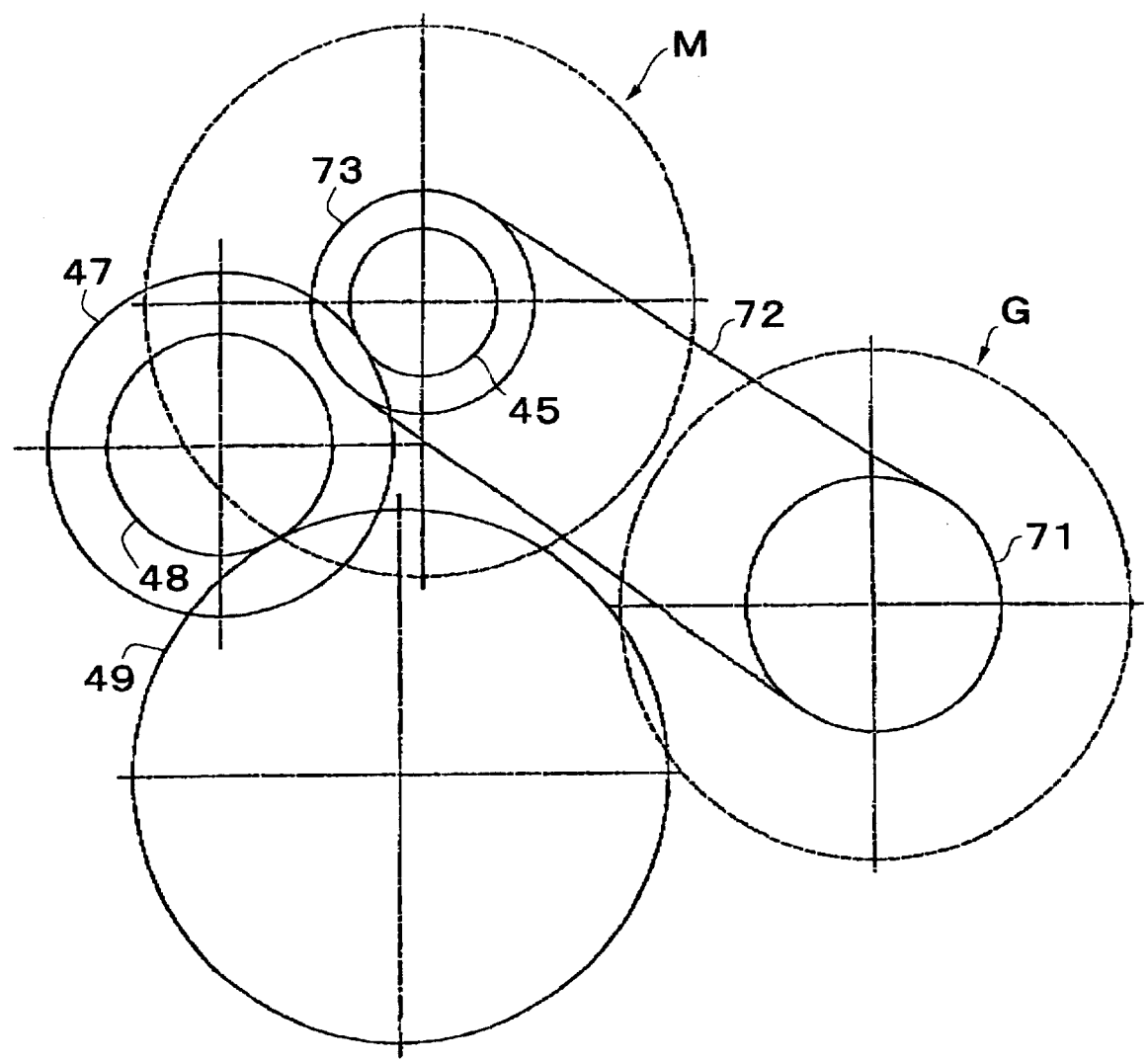
FIG. 35 is an arrangement diagram showing the meshing relationships between each of the power transmission systems of the twenty-sixth exemplary embodiment.

Next, FIGS. 34 and 35 show the twenty-sixth exemplary embodiment. In this exemplary embodiment, the power transmission elements of the engine side power transmission system are the same as those of the above twenty-fifth exemplary embodiment, and the power transmission elements of the electric motor side power transmission system are the same as those of the twentieth exemplary embodiment.

In the case where this form is employed, referring now to the relationship between the actual axial positions and the power transmission elements shown in FIG. 35, it is possible to respectively deal with the alterations to the total gear ratio on the engine side by altering the sprocket diameter. Furthermore, the gear ratio on the electric motor side is altered by changing the diametric relationship of the electric motor output gear 45 to the counter driven gear 47 without altering the axial positions.

The above descriptions have been given only for a transverse type drive apparatus for an FF vehicle or an RR vehicle with each of the exemplary embodiments of the invention placed in one of three groups (FIGS. 1–15, FIGS. 16–23, and FIGS. 24–33). However, the invention can also be embodied in the form of a front engine rear drive (FR) type longitudinal drive apparatus. In the case where this exemplary embodiment is employed, the apparatus is composed of an engine, a generator, a differential gear mechanism linking the engine and the generator, and an electric motor. The basic structure is composed of the output elements of the differential gear mechanism drive linked to the vehicle wheels via the engine side power transmission system, and the electric motor drive linked to the vehicle wheels via the electric motor side power transmission system. Moreover, the drive apparatus is provided with output shafts drive linking each of the above power transmission systems and vehicle wheels. The engine side power transmission system is formed from power transmission elements linking the output element of the differential gear mechanism with the first output gear fixed to an output shaft. The electric motor side power transmission system is formed from power transmission elements linking the rotor shaft of the electric motor with the second output gear fixed to an output shaft.

If this form is used, referring now to FIGS. 13 and 14, although the specific structure is not illustrated, it is clearly obvious that an output shaft has replaced the differential apparatus and an output shaft has replaced the differential ring gear of the ninth and tenth exemplary embodiments.

In this format as well, in the same way as in the above second group of exemplary embodiments, a structure is employed in which the engine side power transmission system is formed from power transmission elements that drive link, via the output shaft, the vehicle wheel and the first counter drive gear linked to an output element of the differential gear mechanism. The electric motor side power transmission system is formed from power transmission elements that drive link the electric motor output gear, fixed to the rotor shaft of the electric motor, and the second counter drive gear, that is linked with an output element of the differential gear mechanism. The electric motor side power transmission system is thus drive linked to the vehicle wheels via the engine side power transmission system.

In this case as well, referring now to FIGS. 20 and 21, although the specific structure is not illustrated, it is clearly obvious that an output shaft has replaced the differential apparatus of each of the exemplary embodiments.

Further, in the same way as in the above third group of exemplary embodiments, a structure is employed in which the electric motor side power transmission system is formed from power transmission elements drive linking the vehicle wheels with the first electric motor output gear fixed to the rotor shaft of the electric motor, and the engine side power transmission system is formed from power transmission elements drive linking the output element of the differential gear mechanism and the second electric motor output gear fixed to the rotor shaft of the electric motor. The engine side power transmission system is thus drive linked to the vehicle wheels via the electric motor side power transmission system.

In this case as well, referring now to FIGS. 29 to 31, although the specific structure is not illustrated, it is clearly obvious that an output shaft has replaced the differential apparatus of each of the exemplary embodiments.

In the structure according to the first exemplary aspect of the invention, the power transmission by the power transmission system on the engine and generator side from the engine to the differential apparatus, and the power transmission by the power transmission system on the electric motor side from the electric motor to the differential apparatus are carried out separately on the respective transmission paths. It is thus possible to make the outputs from the engine side and from the electric motor side completely independent of each other, and for the total gear ratios on both sides down to the differential apparatus to be set freely. Moreover, because both power transmission paths are independent of each other, noise reduction measures taken when gear noise that needs to be reduced is generated are simplified.

In the structure according to the first exemplary aspect of the invention, alterations of the gear ratio settings on both the engine and electric motor sides can be dealt with through the power transmission elements between each of the axes of the engine and generator, electric motor, and differential apparatus. Thus, there is no need for the positions of the main axes to be altered resulting in the casing being the same both before and after altering the gear setting.

Further, in the structure according to the first exemplary aspect of the invention, the power transmission paths of both the engine side and the electric motor side that are formed independently include the input sections to the differential apparatus, thus further simplifying noise reduction measures taken when gear noise needs to be reduced.

Next, in the structure according to the second exemplary aspect of the invention, alterations of the gear ratio settings on both the engine and electric motor sides can be dealt with through the power transmission elements between each of the axes of the engine and generator, electric motor, and differential apparatus while causing the power transmission system on the engine side and the power transmission system on the electric motor side to merge together. Thus, there is no need for the positions of the main axes to be altered, resulting in the casing being the same both before and after alteration of the gear setting.

Moreover, in the structures according to the second exemplary aspect of the invention, alterations of the gear ratio settings on both the engine and electric motor sides can be dealt with through the power transmission elements between each of the axes of the engine and generator, electric motor, and differential apparatus. There is no need for the positions of the main axes to be altered, thus resulting in the casing being the same both before and after alteration of the gear settings.

Moreover, in the structure according to the second exemplary aspect of the invention, the input section to the power transmission path on the engine side from the power transmission path on the electric motor side is a path that is independent from the power transmission path on the engine side, thus simplifying noise reduction measures taken when gear noise that needs to be reduced is generated.

Further, in the structure according to the second exemplary aspect of the invention, the power transmission path on the electric motor side is not affected by restrictions in the distance between axes that goes together with alterations in the gear ratios, simplifying alteration of the total gear ratio on the electric motor side. Moreover, fixing of the total gear ratio on the electric motor side when the total gear ratio on the engine side is altered is also simplified.

Next, in the structure according to the third exemplary aspect of the invention, the flow of the power transmission on the electric motor side is positioned on the downstream side of the two flows of the power transmission on the engine side and the power transmission on the electric motor side. It is thus possible to alter the total gear ratio on the engine and generator side without affecting the total gear ratio of the power transmission system on the electric motor side.

In the structures according to the third exemplary aspect of the invention, alterations of the gear ratio settings on both the engine and electric motor sides can be dealt with through the power transmission elements between each of the axes of the engine and generator, electric motor, and differential apparatus. There is no need for the positions of the main axes to be altered, thus resulting in the casing being the same both before and after alteration of the gear settings.

Moreover, in the structure according to the third exemplary aspect of the invention, the input section to the power transmission path on the electric motor side from the power transmission path on the engine side becomes a path that is independent from the power transmission path on the electric motor side, thus simplifying noise reduction measures taken when gear noise that needs to be reduced is generated.

Moreover, in the structure according to the third exemplary aspect of the invention, the power transmission path on the engine side is not affected by restrictions of the distance between axes that goes together with alterations of the gear ratios, thus simplifying alteration of the total gear ratio on only the engine side.

In the structure according to the fourth exemplary aspect of the invention, the power transmission by the power transmission system on the engine and generator side from the engine to the output shaft, and the power transmission by the power transmission system on the electric motor side from the electric motor to the output shaft are carried out separately on the respective transmission paths. It is thus possible to make the outputs from engine side and from the electric motor side completely independent of each other, and for the total gear ratios on both sides down to the output shafts to be set freely. Moreover, both power transmission paths are independent of each other, thus simplifying noise reduction measures taken when gear noise that needs to be reduced is generated.

In the structure according to the fifth exemplary aspect of the invention, it is possible to form a power transmission system with no simultaneous meshing by performing the power transmission of the power transmission system on the electric motor side via the power transmission system on the engine and generator side, thus simplifying noise reduction measures taken when gear noise that needs to be reduced is generated.

In the structure according to the sixth exemplary aspect of the invention, it is possible to form a power transmission system with no simultaneous meshing by performing the power transmission of the power transmission system on the engine and generator side via the power transmission system on the electric motor side, thus simplifying noise reduction measures taken when gear noise that needs to be reduced is generated.

In the structure according to any one of the first to the sixth exemplary aspects of the invention, all of the respective power transmission elements forming the power transmission system on the engine and generator side and the power transmission system on the electric motor side are placed within the same plane. Accordingly this structure is effective when the axial length of the drive apparatus is limited.

In the structure according to any one of the first to the sixth exemplary aspects of the invention, it is possible to alter the total gear ratios on both the engine side and the electric motor side without having to alter the positions of either the main axes or the axes of each of the power transmission elements.

In the structure according to any one of the first to the sixth exemplary aspects of the invention, it is possible to deal flexibly with the limited axial length of the drive apparatus and with whether there needs to be an alteration in the axial positions of the respective power transmission elements due to an alteration of the total gear ratio.

In the structure according to any one of the first to the sixth exemplary aspects of the invention, there is absolutely no need for any alteration in the axial positions of the respective power transmission elements due to an alteration of the total gear ratio.

The invention has been described above by offering a plurality of exemplary embodiments thereof, however, these exemplary embodiments do not cover the entire scope of the technological ideas of the invention. The invention may be implemented by altering the specific structure thereof in a variety of ways within the scope of the description herein.

What is claimed is:

1. A hybrid drive apparatus, comprising:
   an engine;
   a generator;
   a differential gear mechanism linking the engine and the generator;
   an electric motor; and
   a differential apparatus, in which an output element of the differential gear mechanism is drive linked to the differential apparatus via a power transmission system on the side of the engine and generator, and the electric motor is drive linked to the differential apparatus via a power transmission system on the side of the electric motor, wherein:
   the engine and the generator and the differential gear mechanism are placed on a common axis and output shafts of the electric motor and the differential apparatus are each placed on their own different axes which are parallel to the common axis, and
   the power transmission system on the side of the engine and generator and the power transmission system on the side of the electric motor are each formed from separate power transmission elements, and both are drive linked at the most downstream ends of their respective power transmission systems with the differential apparatus.

2. The hybrid drive apparatus according to claim 1, wherein:
   the power transmission system on the side of the engine and generator are formed from power transmission elements that drive link the output element of the differential gear mechanism and a differential input gear of the differential apparatus, and
   the power transmission system on the side of the electric motor is formed from power transmission elements that drive link a rotor shaft of the electric motor and the differential input gear.

3. The hybrid drive apparatus according to claim 2, wherein the power transmission element is an idle gear.

4. The hybrid drive apparatus according to claim 2, wherein the power transmission element is a counter reduction gear mechanism.

5. The hybrid drive apparatus according to claim 2, wherein the power transmission element in one of the power transmission systems is an idle gear, and the power transmission element in the other power transmission system is a counter reduction gear mechanism.

6. The hybrid drive apparatus according to claim 2, wherein a coaxial reduction mechanism is inserted in at least one of the power transmission systems.

7. The hybrid drive apparatus according to claim 1, wherein:
   the differential input gear of the differential apparatus comprises a first and a second differential input gear,
   the power transmission system on the side of the engine and generator is formed from power transmission elements that drive link the output element of the differential gear mechanism and the first differential input gear, and
   the power transmission system on the side of the electric motor is formed from power transmission elements that drive link the rotor shaft of the electric motor and the second differential input gear.

8. The hybrid drive apparatus according to claim 7, wherein the power transmission element is an idle gear.

9. The hybrid drive apparatus according to claim 7, wherein the power transmission element is a counter reduction gear mechanism.

10. The hybrid drive apparatus according to claim 7, wherein the power transmission element in one of the power transmission systems is an idle gear, and the power transmission element in the other power transmission system is a counter reduction gear mechanism.

11. The hybrid drive apparatus according to claim 7, wherein a coaxial reduction mechanism is inserted in at least one of the power transmission systems.

12. The hybrid drive apparatus according to claim 1, wherein a coaxial reduction mechanism is inserted in at least one of the power transmission systems.

13. A hybrid drive apparatus, comprising:
an engine;
a generator;
a differential gear mechanism linking the engine and the generator;
an electric motor; and
a differential apparatus, in which an output element of the differential gear mechanism is drive linked to the differential apparatus via a power transmission system on the side of the engine and generator, and the electric motor is drive linked to the differential apparatus via a power transmission system on the side of the electric motor, wherein:
the engine and the generator and the differential gear mechanism are placed on a common axis and output shafts of the electric motor and the differential apparatus are each placed on their own different axes which are parallel to the common axis, and
the power transmission system on the side of the electric motor is drive linked to the differential apparatus via the power transmission system on the side of the engine and generator.

14. The hybrid drive apparatus according to claim 13, wherein:
the power transmission system on the side of the engine and generator is formed from power transmission elements that drive link the output element of the differential gear mechanism and the differential input gear of the differential apparatus, and
the power transmission system on the side of the electric motor is formed from power transmission elements that drive link the rotor shaft of the electric motor and the output element of the differential gear mechanism.

15. The hybrid drive apparatus according to claim 14, wherein:
the power transmission system on the side of the engine and generator is formed from a counter drive gear linked to the output element of the differential gear mechanism and power transmission elements that drive link the counter drive gear and the differential input gear, and
the power transmission system on the side of the electric motor is formed from an electric motor output gear fixed to the rotor shaft of the electric motor power transmission elements that drive link this electric motor output gear and the counter drive gear.

16. The hybrid drive apparatus according to claim 15, wherein the power transmission element is an idle gear.

17. The hybrid drive apparatus according to claim 15, wherein the power transmission element is a counter reduction gear mechanism.

18. The hybrid drive apparatus according to claim 15, wherein the power transmission element in one of the power transmission systems is an idle gear, and the power transmission element in the other power transmission system is a counter reduction gear mechanism.

19. The hybrid drive apparatus according to claim 15, wherein a coaxial reduction mechanism is inserted in at least one of the power transmission systems.

20. The hybrid drive apparatus according to claim 14, wherein:
the power transmission system on the side of the engine and generator is formed from a first counter drive gear linked to the output element of the differential gear mechanism and power transmission elements that drive link this first counter drive gear and the differential input gear, and
the power transmission system on the side of the electric motor is formed from an electric motor output gear fixed to the rotor shaft of the electric motor power transmission elements that drive link the electric motor output gear and a second counter drive gear linked to the output element of the differential gear mechanism.

21. The hybrid drive apparatus according to claim 20, wherein the power transmission element is an idle gear.

22. The hybrid drive apparatus according to claim 20, wherein the power transmission element is a counter reduction gear mechanism.

23. The hybrid drive apparatus according to claim 20, wherein the power transmission element in one of the power transmission systems is an idle gear, and the power transmission element in the other power transmission system is a counter reduction gear mechanism.

24. The hybrid drive apparatus according to claim 20, wherein a coaxial reduction mechanism is inserted in at least one of the power transmission systems.

25. The hybrid drive apparatus according to claim 14, wherein the power transmission system on the side of the electric motor comprises a sprocket fixed to the rotor shaft of the electric motor, a sprocket linked to the output element of the differential gear mechanism, and a chain entrained between the two sprockets.

26. The hybrid drive apparatus according to claim 25, wherein the power transmission element is an idle gear.

27. The hybrid drive apparatus according to claim 25, wherein the power transmission element is a counter reduction gear mechanism.

28. The hybrid drive apparatus according to claim 25, wherein the power transmission element in one of the power transmission systems is an idle gear, and the power transmission element in the other power transmission system is a counter reduction gear mechanism.

29. The hybrid drive apparatus according to claim 25, wherein a coaxial reduction mechanism is inserted in at least one of the power transmission systems.

30. The hybrid drive apparatus according to claim 14, wherein the power transmission element is an idle gear.

31. The hybrid drive apparatus according to claim 14, wherein the power transmission element is a counter reduction gear mechanism.

32. The hybrid drive apparatus according to claim 14, wherein the power transmission element in one of the power transmission systems is an idle gear, and the power transmission element in the other power transmission system is a counter reduction gear mechanism.

33. The hybrid drive apparatus according to claim 14, wherein a coaxial reduction mechanism is inserted in at least one of the power transmission systems.

34. The hybrid drive apparatus according to claim 13, wherein a coaxial reduction mechanism is inserted in at least one of the power transmission systems.

35. A hybrid drive apparatus, comprising:
an engine;
a generator;
a differential gear mechanism linking the engine and the generator;
an electric motor; and
a differential apparatus, in which the output element of the differential gear mechanism is drive linked to the differential apparatus via a power transmission system on the side of the engine and generator, and the electric motor is drive linked to the differential apparatus via a power transmission system on the side of the electric motor, wherein:

the engine and the generator and the differential gear mechanism are placed on a common axis and output shafts of the electric motor and the differential apparatus are each placed on their own different axes which are parallel to the common axis, and the power transmission system on the side of the engine and generator are drive linked to the differential apparatus via the power transmission system on the side of the electric motor.

36. The hybrid drive apparatus according to claim 35, wherein:

the power transmission system on the side of the electric motor is formed from power transmission elements drive linking the rotor shaft of the electric motor and the differential input gear of the differential apparatus, and the power transmission system on the side of the engine and generator is formed from power transmission elements that drive link the output element of the differential gear mechanism and the rotor shaft of the electric motor.

37. The hybrid drive apparatus according to claim 36, wherein:

the power transmission system on the side of the electric motor is formed from the electric motor output gear fixed to the rotor shaft of the electric motor and power transmission elements drive linking the electric motor output gear and the differential input gear, and the power transmission system on the side of the engine and generator is formed from power transmission elements that drive link the output element of the differential gear mechanism and the electric motor output gear.

38. The hybrid drive apparatus according to claim 37, wherein the power transmission element is an idle gear.

39. The hybrid drive apparatus according to claim 37, wherein the power transmission element is a counter reduction gear mechanism.

40. The hybrid drive apparatus according to claim 37, wherein the power transmission element in one of the power transmission systems is an idle gear, and the power transmission element in the other power transmission system is a counter reduction gear mechanism.

41. The hybrid drive apparatus according to claim 37, wherein a coaxial reduction mechanism is inserted in at least one of the power transmission systems.

42. The hybrid drive apparatus according to claim 36, wherein:

the power transmission system on the side of the electric motor is formed from the first electric motor output gear fixed to the rotor shaft of the electric motor and power transmission elements drive linking the first electric motor output gear and the differential input gear, and the power transmission system on the side of the engine and generator is formed from power transmission elements that drive link the output element of the differential gear mechanism and the second electric motor output gear that is fixed to the rotor shaft of the electric motor.

43. The hybrid drive apparatus according to claim 42, wherein the power transmission element is an idle gear.

44. The hybrid drive apparatus according to claim 42, wherein the power transmission element is a counter reduction gear mechanism.

45. The hybrid drive apparatus according to claim 42, wherein the power transmission element in one of the power transmission systems is an idle gear, and the power transmission element in the other power transmission system is a counter reduction gear mechanism.

46. The hybrid drive apparatus according to claim 42, wherein a coaxial reduction mechanism is inserted in at least one of the power transmission systems.

47. The hybrid drive apparatus according to claim 36, wherein the power transmission system on the side of the engine and generator comprises a sprocket linked to the output element of the differential gear mechanism, a sprocket fixed to the rotor shaft of the electric motor, and a chain entrained between the two sprockets.

48. The hybrid drive apparatus according to claim 47, wherein the power transmission element is an idle gear.

49. The hybrid drive apparatus according to claim 47, wherein the power transmission element is a counter reduction gear mechanism.

50. The hybrid drive apparatus according to claim 47, wherein the power transmission element in one of the power transmission systems is an idle gear, and the power transmission element in the other power transmission system is a counter reduction gear mechanism.

51. The hybrid drive apparatus according to claim 47, wherein a coaxial reduction mechanism is inserted in at least one of the power transmission systems.

52. The hybrid drive apparatus according to claim 36, wherein the power transmission element is an idle gear.

53. The hybrid drive apparatus according to claim 36, wherein the power transmission element is a counter reduction gear mechanism.

54. The hybrid drive apparatus according to claim 36, wherein the power transmission element in one of the power transmission systems is an idle gear, and the power transmission element in the other power transmission system is a counter reduction gear mechanism.

55. The hybrid drive apparatus according to claim 36, wherein a coaxial reduction mechanism is inserted in at least one of the power transmission systems.

56. The hybrid drive apparatus according to claim 35, wherein a coaxial reduction mechanism is inserted in at least one of the power transmission systems.

57. A hybrid drive apparatus, comprising:

an engine;

a generator;

a differential gear mechanism linking the engine and the generator; and an electric motor, in which an output element of the differential gear mechanism is drive linked to the vehicle wheels via a power transmission system on the side of the engine and generator, and the electric motor is drive linked to the vehicle wheels via a power transmission system on the side of the electric motor, wherein:

the hybrid drive apparatus is provided with output shafts drive linking each of the power transmission systems and the vehicle wheels, the power transmission system on the side of the engine and generator is formed from power transmission elements drive linking the output element of the differential gear mechanism and a first output gear fixed to an output shaft, and the power transmission system on the side of the electric motor is formed from power transmission elements drive linking the rotor shaft of the electric motor and a second output gear fixed to an output shaft.

58. The hybrid drive apparatus according to claim 57, wherein the power transmission element is an idle gear.

59. The hybrid drive apparatus according to claim 57, wherein the power transmission element is a counter reduction gear mechanism.

60. The hybrid drive apparatus according to claim 57, wherein the power transmission element in one of the power transmission systems is an idle gear, and the power transmission element in the other power transmission system is a counter reduction gear mechanism.

61. The hybrid drive apparatus according to claim 57, wherein a coaxial reduction mechanism is inserted in at least one of the power transmission systems.

62. A hybrid drive apparatus, comprising:
an engine;
a generator;
a differential gear mechanism linking the engine and the generator; and
an electric motor, in which an output element of the differential gear mechanism is drive linked to the vehicle wheels via a power transmission system on the side of the engine and generator, and the electric motor is drive linked to the vehicle wheels via a power transmission system on the side of the electric motor, wherein:
  the power transmission system on the side of the engine and generator is formed from a first counter drive gear linked to an output element of the differential gear mechanism and power transmission elements drive linking this first counter drive gear and the vehicle wheels,
  the power transmission system on the side of the electric motor is formed from an electric motor output gear fixed to the rotor of the electric motor and power transmission elements drive linking this electric motor output gear and a second counter drive gear linked to an output element of the differential gear mechanism, and
  the power transmission system on the side of the electric motor is drive linked to the vehicle wheels via the power transmission system on the side of the engine and generator.

63. The hybrid drive apparatus according to claim 62, wherein the power transmission element is an idle gear.

64. The hybrid drive apparatus according to claim 62, wherein the power transmission element is a counter reduction gear mechanism.

65. The hybrid drive apparatus according to claim 62, wherein the power transmission element in one of the power transmission systems is an idle gear, and the power transmission element in the other power transmission system is a counter reduction gear mechanism.

66. The hybrid drive apparatus according to claim 62, wherein a coaxial reduction mechanism is inserted in at least one of the power transmission systems.

67. A hybrid drive apparatus, comprising:
an engine;
a generator;
a differential gear mechanism linking the engine and the generator; and
an electric motor, in which an output element of the differential gear mechanism is drive linked to the vehicle wheels via a power transmission system on the side of the engine and generator, and the electric motor is drive linked to the vehicle wheels via a power transmission system on the side of the electric motor, wherein:
  the power transmission system on the side of the electric motor is formed from a first electric motor output gear fixed to the rotor of the electric motor and power transmission elements drive linking the first electric motor output gear and the vehicle wheels,
  the power transmission system on the side of the engine and generator is formed from power transmission elements drive linking the output element of the differential gear mechanism and a second electric motor output gear fixed to the rotor shaft of the electric motor, and
  the power transmission system on the side of the engine and generator is drive linked to the vehicle wheels via the power transmission system on the side of the electric motor.

68. The hybrid drive apparatus according to claim 67, wherein the power transmission element is an idle gear.

69. The hybrid drive apparatus according to claim 67, wherein the power transmission element is a counter reduction gear mechanism.

70. The hybrid drive apparatus according to claim 67, wherein the power transmission element in one of the power transmission systems is an idle gear, and the power transmission element in the other power transmission system is a counter reduction gear mechanism.

71. The hybrid drive apparatus according to claim 67, wherein a coaxial reduction mechanism is inserted in at least one of the power transmission systems.

* * * * *